US011237455B2

(12) United States Patent
Chuang et al.

(10) Patent No.: US 11,237,455 B2
(45) Date of Patent: Feb. 1, 2022

(54) FREQUENCY CONVERSION USING STACKED STRONTIUM TETRABORATE PLATES

(71) Applicant: KLA Corporation, Milpitas, CA (US)

(72) Inventors: Yung-Ho Alex Chuang, Cupertino, CA (US); Yinying Xiao-li, San Jose, CA (US); Elena Loginova, Milpitas, CA (US); John Fielden, Los Altos, CA (US); Baigang Zhang, San Jose, CA (US)

(73) Assignee: KLA Corporation, Milpitas, CA (US)

( * ) Notice: Subject to any disclaimer, the term of this patent is extended or adjusted under 35 U.S.C. 154(b) by 0 days.

(21) Appl. No.: 17/239,561

(22) Filed: Apr. 24, 2021

(65) Prior Publication Data

US 2021/0389643 A1    Dec. 16, 2021

Related U.S. Application Data

(60) Provisional application No. 63/076,391, filed on Sep. 10, 2020, provisional application No. 63/038,134, filed on Jun. 12, 2020.

(51) Int. Cl.
  *G02F 1/355* (2006.01)
  *G02F 1/35* (2006.01)

(52) U.S. Cl.
  CPC .......... *G02F 1/3551* (2013.01); *G02F 1/3503* (2021.01); *G02F 1/354* (2021.01);
  (Continued)

(58) Field of Classification Search
  CPC .................................... G02F 1/3558
  See application file for complete search history.

(56) References Cited

U.S. PATENT DOCUMENTS 6,201,601 B1    3/2001  Vaez-Iravani et al.
6,271,916 B1    8/2001  Marxer et al.
(Continued)

FOREIGN PATENT DOCUMENTS

CN    110068979 A    7/2019
EP     1255331 A1   11/2002
(Continued)

OTHER PUBLICATIONS

A. S. Aleksandrovsky, I. E. Shakhura, A. M. Vyunyshev, A. I. Zaitsev and A. V. Zamkov, "Nonlinear diffraction and random QPM in strontium tetraborate," 2008 4th International Conference on Advanced Optoelectronics and Lasers, 2008, pp. 398-400, doi: 10.1109/CAOL.2008.4671848. (Year: 2008).*

(Continued)

*Primary Examiner* — Rhonda S Peace
(74) *Attorney, Agent, or Firm* — Bever, Hoffman & Harms, LLP

(57) ABSTRACT

A nonlinear crystal including stacked Strontium tetraborate $SrB_4O_7$ (SBO) crystal plates that are cooperatively configured to create a periodic structure for quasi-phase-matching (QPM) is used in the final frequency converting stage of a laser assembly to generate laser output light having a wavelength in the range of 125 nm to 183 nm. One or more fundamental light beams having fundamental wavelengths between 1 and 1.1 μm are doubled and/or summed using multiple intermediate frequency conversion stages to generate one or more intermediate light beam frequencies (e.g., second through eighth harmonics, or sums thereof), and then the final frequency converting stage utilizes the nonlinear crystal to either double a single intermediate light beam frequency or to sum two intermediate light beam frequencies to generate the desired laser output light at high power and
(Continued)

photon energy levels. A method and inspection system incorporating the laser assembly is also described.

23 Claims, 13 Drawing Sheets

(52) U.S. Cl.
CPC .......... *G02F 1/3507* (2021.01); *G02F 1/3534* (2013.01); *G02F 1/3542* (2021.01); *G02F 1/3558* (2013.01)

(56) References Cited

U.S. PATENT DOCUMENTS

| | | | |
|---|---|---|---|
| 7,525,649 | B1 | 4/2009 | Leong et al. |
| 7,817,260 | B2 | 10/2010 | Chuang et al. |
| 8,298,335 | B2 | 10/2012 | Armstrong |
| 8,824,514 | B2 | 9/2014 | Armstrong |
| 8,976,343 | B2 | 3/2015 | Genis |
| 9,023,152 | B2 | 5/2015 | Dribinski |
| 9,059,560 | B2 | 6/2015 | Dribinski et al. |
| 9,250,178 | B2 | 2/2016 | Chuang et al. |
| 9,293,882 | B2 | 3/2016 | Chuang |
| 9,459,215 | B2 | 10/2016 | Chuang et al. |
| 9,461,435 | B2 | 10/2016 | Dribinski et al. |
| 9,509,112 | B2 | 11/2016 | Chuang et al. |
| 9,660,409 | B2 | 5/2017 | Chuang |
| 9,891,177 | B2 | 2/2018 | Vazhaeparambil et al. |
| 10,044,166 | B2 | 8/2018 | Chuang et al. |
| 10,175,555 | B2 | 1/2019 | Chuang et al. |
| 10,282,366 | B2 | 5/2019 | Cai et al. |
| 10,809,594 | B2 * | 10/2020 | Yu .................. G02F 1/3501 |
| 10,921,261 | B2 * | 2/2021 | Chuang .............. G02B 5/283 |
| 2005/0163187 | A1 | 7/2005 | Spinelli et al. |
| 2014/0305367 | A1 | 10/2014 | Chuang et al. |
| 2018/0034227 | A1 | 2/2018 | Trull-Silvestre et al. |
| 2021/0010948 | A1* | 1/2021 | Chuang .............. G03F 7/70958 |

FOREIGN PATENT DOCUMENTS

| | | | | |
|---|---|---|---|---|
| WO | WO-2020131652 | A1 * | 6/2020 | ............. H01S 3/109 |
| WO | WO-2020132043 | A1 * | 6/2020 | ............. H01S 3/109 |

OTHER PUBLICATIONS

Faris, Gregory W. et al., article entitled "Two-photon excitation of neon at 133 nm", Optics Letters, vol. 18, No. 5, Mar. 1, 2003, 3 pages.

Kurimura, Sunao et al., article entitled "Quartz revisits nonlinear optics: twinned crystal for quasi-phase matching [Invited]", Optical Materials Express 1375, Nov. 1, 2011, vol. 1, No. 7, 9 pages.

Oseledchik, Yu S., et al., article entitled "New nonlinear optical crystals: strontium and lead tetraborates", Optical Materials 4, Jun. 15, 1995, pp. 669-674.

Petrov, Valentin et al., article entitled "Application of the nonlinear crystal SrB4O7 for ultrafast diagnostics converting to wavelengths as short as 125 nm", Optics Letters, Feb. 15, 2004, vol. 29, No. 4, 3 pages.

Szilagyi, A., et al., article entitled "A quasi-phase-matching technique for efficient optical mixing and frequency doubling", Journal of Applied Physics 47.2025 (1976), published online: Aug. 28, 2008, 9 pages.

Trabs, Peter et al., article entitled "Generation of Coherent Vacuum UV Radiation in Randomly Quasi-Phase-Matched Strontium Tetraborate", Optics Letters, May 2015, 3 pages.

Trabs, Peter et al., article entitled "Spectral fringes in non-phase-matched SHG and refinement of dispersion relations in the VUV", Optical Society of America, published Apr. 10, 2015, vol. 23, No. 8, Optics Express 10091, 6 pages.

Tunnermann, Andreas et al., "Generation of Tunable Short Pulse VUV Radiation by Four-Wave Mixing in Xenon with Femtosecond KrF-Excimer Laser Pulses", IEEE Journal of Quantum Electronics, Vo. 29, No. 4, Apr. 1993, 6 pages.

Villora, Encarnacion G., et al., article entitled "Birefringent- and quasi phase-matching with BaMgF4 for vacuum-UV/UV and mid-IR all solid-state lasers", Optical Society of America, published Jul. 6, 2009, vol. 17, No. 15, 17 pages.

* cited by examiner

FREQUENCY CONVERSION USING STACKED STRONTIUM TETRABORATE PLATES

CROSS REFERENCE TO RELATED APPLICATIONS

This application claims priority from U.S. Provisional Patent Application No. 63/038,134, entitled "177 nm and 133 nm CW Lasers Using Stacked Strontium Tetraborate Plates", which was filed on Jun. 12, 2020, and is incorporated by reference herein. This application also claims priority from U.S. Provisional Patent Application No. 63/076,391, entitled "152 nm and 177 nm CW Lasers Using Stacked Strontium Tetraborate Plates", which was filed on Sep. 10, 2020, and is incorporated by reference herein.

This application is also related to the following U.S. patent documents, all of which are incorporated by reference herein: U.S. Pat. No. 6,201,601 to Vaez-Iravani et al., U.S. Pat. No. 6,271,916 to Marxer et al., U.S. Pat. No. 7,525,649 to Leong et al., U.S. Pat. No. 7,817,260 to Chuang et al., U.S. Pat. Nos. 8,298,335 and 8,824,514 to Armstrong, U.S. Pat. No. 8,976,343 to Genis, U.S. Pat. No. 9,023,152 to Dribinski, U.S. Pat. Nos. 9,461,435 and 9,059,560 to Dribinski et al., U.S. Pat. Nos. 9,293,882 and 9,660,409, to Chuang, U.S. Pat. Nos. 9,250,178, 9,459,215, 9,509,112, 10,044,166 and 10,283,366 to Chuang et al., and Published U.S. Patent Application 2014/0305367 to Dribinski et al.

BACKGROUND OF THE DISCLOSURE

Field of the Disclosure

The present application relates to lasers capable of generating light having VUV wavelengths, and more particularly to lasers capable of generating light in the range of approximately 125 nm to 183 nm and inspection systems that use such lasers to inspect, e.g., photomasks, reticles, and semiconductor wafers.

Related Art

As semiconductor devices' dimensions shrink, the size of the smallest particle or pattern defect that can cause a device to fail also shrinks. Hence a need arises for detecting smaller particles and defects on patterned and unpatterned semiconductor wafers and reticles. The intensity of light scattered by particles smaller than the wavelength of that light generally scales as a high power of the dimensions of that particle (for example, the total scattered intensity of light from an isolated small spherical particle scales proportional to the sixth power of the diameter of the sphere and inversely proportional to the fourth power of the wavelength). Because of the increased intensity of the scattered light, shorter wavelengths will generally provide better sensitivity for detecting small particles and defects than longer wavelengths.

Since the intensity of light scattered from small particles and defects is generally very low, high illumination intensity is required to produce a signal that can be detected in a very short time. Average light source power levels of 0.3 W or more may be required. At these high average power levels, a high pulse repetition rate is desirable as the higher the repetition rate, the lower the energy per pulse and hence the lower the risk of damage to the system optics or the article being inspected. The illumination needs for inspection and metrology are generally best met by continuous wave (CW) light sources. A CW light source has a constant power level, which avoids the peak power damage issues and also allows for images or data to be acquired continuously. However, in some cases, mode-locked lasers with repetition rates of about 50 MHz or higher may be useful because the high repetition rate means that the energy per pulse can be low enough to avoid damage for certain metrology and inspection applications.

Pulsed lasers for generating VUV light are known in the art. Prior-art lasers for generating light at 133 nm are well known (see for instance, G. W. Faris, and M. J. Dyer, "Two-photon excitation of neon at 133 nm", Opt. Lett. 18, 382 (1993) and A. Tünnermann, C. Momma, K. Mossavi, C. Windolph, and B. Wellegehausen, "Generation of tunable short pulse VUV radiation by four-wave mixing in Xenon with femtosecond KrF-excimer laser pulses", IEEE J. Quantum Electron. 29, 1233 (1993)). Unfortunately, such lasers are not well suited to inspection applications because of their low laser pulse repetition rates and low average power levels.

However, mode-locked and CW lasers with wavelengths in the VUV range are not commercially available at sufficient power level or are very unreliable. There has not been any prior art for generating mode-locked or CW light in the wavelength range down to approximately 133 nm at powers greater than about 0.3 W.

A pulsed light source has an instantaneous peak power level much higher than the time-averaged power level of a CW light source. The very high peak power of the laser pulses can result in damage to the optics and to the sample or wafer being measured, as most damage mechanisms are non-linear and depend more strongly on peak power rather than on average power. The higher the pulse repetition rate, the lower the instantaneous peak power per pulse for the same time-averaged power level.

Therefore, a need arises for a mode-locked or CW laser that generates radiation in vacuum ultraviolet (VUV) range, particularly shorter than 133 nm, and is suitable for use in inspection of photomasks, reticles, and/or wafers. If a laser enabling mode-locked or CW output at near 133 nm at higher power level can be practically produced, it could enable more accurate and faster inspection and metrology and contribute to cutting-edge semiconductor production.

Also, a need arises for providing an inspection system and associated laser systems that is capable of generating mode-locked or CW laser light having an output VUV wavelength such as in the range of approximately 125 nm to approximately 183 nm and avoids some, or all, of the above problems and disadvantages.

SUMMARY OF THE DISCLOSURE

The present invention generally relates to nonlinear crystals including stacked strontium tetraborate $SrB_4O_7$ (SBO) crystal plates that form a periodic structure capable of achieving quasi-phase-matching (QPM) suitable for frequency conversion of applied light, thereby facilitating the generation of DUV and VUV laser light at high power and photon energy levels while avoiding the above-mentioned problems and disadvantages associated with prior art approaches. SBO crystal exhibits attractive features (e.g., broad transparency range, good damage resistivity and chemical stability, high microhardness, and a high diagonal $d_{33}$ element value compared to the band-gap value) that avoid many of the above-mentioned problems and disadvantages associated with prior art approaches. However, single SBO crystals also exhibit low birefringence that makes frequency conversion by critical or non-critical phase matching impossible. The present invention circumvents SBO's low birefringence by way of cooperatively configuring SBO crystal plates to form a periodic structure that achieves QPM of one or more input light frequencies (intermediate light beams) such that light exiting the nonlinear crystal includes laser output light having a desired DUV/VUV output frequency. In one embodiment the cooperative configuration includes physically stacking separate SBO crystal plates such that the crystal axes of the sequentially arranged crystal plates are alternatively inverted (i.e., the crystal axis of a given SBO crystal plate is rotated by substantially 180° with respect to the crystal axis of adjacent SBO crystal plate(s) having shared interface surface(s) with the given plate in the stack), thereby forming a periodic structure that is analogous to a periodically-poled crystal material (i.e., with each SBO crystal plate forming a physical pole in the periodic structure). Each nonlinear crystal is further configured for use in a given optical system by way of orienting the SBO crystal plates such that the inverted crystal axes are aligned perpendicular to the polarization direction of light as it passes through the SBO crystal stack within the optical system, and by forming the SBO crystal plates such that the thickness of at least one SBO crystal plate produces a spacing between poles (i.e., the distance traveled by light between the opposing surfaces of each plate in the light's propagation direction) that is substantially equal to an odd multiple of a critical length to enable quasi phase matching of the one or more input light frequencies and the output frequency. By cooperatively configuring two or more SBO crystal plates in this manner, nonlinear crystals produced in accordance with the present invention facilitate frequency conversion (e.g., frequency doubling of one input light frequency or frequency summing of two or more input light frequencies) required to generate DUV and VUV wavelengths at high power levels (i.e., from several milliwatts (mW) to several watts (W) or more) and high photon energy levels (for example 7.00 eV at 177 nm and 9.32 eV at 133 nm) while avoiding the above-mentioned problems and disadvantages associated with prior art approaches. Although primarily described with specific reference to practical applications involving the generation of CW laser light, the nonlinear crystals disclosed herein are usable in other optical systems and for other purposes including generating pulsed laser light without departing from the spirit and scope of the present invention.

In the specifically disclosed embodiments described below, the present invention is directed to improvements in inspection systems utilized in the semiconductor fabrication industry, and in particular to laser assemblies for such inspection systems that are capable of generating mode-locked or continuous wave (CW) laser light having a light source power level of 0.3 W or more and having an output wavelength in the range of approximately 125 nm to approximately 183 nm. In a practical embodiment, each nonlinear crystal is utilized in a final frequency conversion stage of an associated laser assembly that also includes at least one fundamental laser and two or more intermediate frequency conversion stages, where each fundamental laser respectively generates a fundamental light beam having a corresponding fundamental frequency (e.g., having wavelengths between about 1 μm and 1.1 μm), and the intermediate frequency conversion stages are collectively configured to convert the fundamental light beam(s) into at least one intermediate light beam having an associated intermediate frequency. The final frequency conversion stage is configured to direct the intermediate light beam(s) through the inverted SBO crystal plates forming the nonlinear crystal such that a polarization direction (electric field direction) of the light is substantially parallel to c-axis (or a-axis) of each plate's crystal axis, whereby the periodic structure of the stacked SBO crystal plates achieves QPM of the intermediate light beam(s). In a specific embodiment, the final frequency conversion stage includes multiple mirrors operably configured (e.g., in a bow-tie ring cavity formation) to receive and circulate at least one of the intermediate light beams (e.g., by way of one or more matching lenses) such that a beam waist of the circulated light occurs at (i.e., inside or proximate to) the nonlinear crystal. In one embodiment the final frequency conversion stage utilizes a beam splitter (e.g., SBO crystal, SBO glass, or $CaF_2$ crystal) that is configured to split the exiting light (i.e., light leaving/exiting the nonlinear crystal) such that a reflected (first) portion of the exiting light forms the desired laser output light beam having an output wavelength in the range of approximately 125 nm to approximately 183 nm, and such that the non-reflected (second) portion of the exiting light comprising unconsumed input light is passed by the beam splitter for circulation by the cavity mirrors. Note that in the following description, where a wavelength is mentioned without qualification, that wavelength may be assumed to be the wavelength in vacuum.

In the specifically disclosed embodiments, the present invention is directed to improved laser systems for inspection systems utilized in the semiconductor fabrication industry, and in particular to laser assemblies for such inspection systems that are capable of generating laser light having a light source power level of 0.3 W or more and having an output wavelength in the range of approximately 128 nm to approximately 134 nm (e.g., approximately 133 nm), in the range of approximately 147 nm to 155 nm (e.g., approximately 152 nm), or in the range of approximately 170 nm to 180 nm (e.g., approximately 177 nm). In some specific embodiments disclosed herein, nonlinear crystals include SBO crystal layers that are cooperatively configured to frequency-double a single intermediate light beam having a UV wavelength near 355 nm or a DUV wavelength near 266 nm to generate laser light having a VUV wavelength near 177 nm or near 133 nm, respectively. In other embodiments disclosed herein linear crystals include SBO crystal layers that are cooperatively configured to frequency-sum two intermediate light beams to generate laser light having desired VUV wavelengths. For example, in one embodiment disclosed herein, a linear crystal includes SBO crystal layers that are cooperatively configured to frequency-sum a first intermediate light beam having a UV wavelength near 355 nm with a second intermediate light beam having a DUV wavelength near 266 nm to generate laser light having a VUV output wavelength near 152 nm. In another embodiment disclosed herein, a linear crystal includes SBO crystal layers that are cooperatively configured to sum a first intermediate light beam having visible wavelength near 532 nm with a second intermediate light beam having a DUV wavelength near 213 nm to generate laser light having a VUV wavelength near 152 nm. In yet another alternative embodiment, a linear crystal includes SBO crystal layers that are cooperatively configured to sum a first intermediate light beam having a visible wavelength near 532 nm with a second intermediate light beam having a DUV wavelength near 266 nm to generate CW laser light having a VUV output wavelength near 177 nm. In specific embodiments, a beam splitter is utilized to direct (pass) a selected intermediate harmonic frequency back into the final frequency conversion cavity for circulation and to redirect (reflect) the desired output frequency out of the laser assembly, and the crystal plates are formed with a corresponding thickness such that a spacing between poles in each periodic structure (i.e., the distance traveled by light between the opposing surfaces of each plate) is substantially equal to an odd integer multiple of an associated QPM critical length.

In accordance with the laser assemblies and associated methods described herein with reference to a first specific embodiment, laser output light with an output frequency having a wavelength of approximately 133 nm is produced by way of generating fundamental light having a fundamental frequency with a corresponding fundamental wavelength in the range of approximately 1000 nm to approximately 1100 nm, utilizing the fundamental light to generate a second harmonic of the fundamental light, utilizing the second harmonic to generate a fourth harmonic of the first fundamental light, and utilizing the fourth harmonic as intermediate light that is then passed to the final frequency conversion stage. According to an aspect of the first embodiment, the final frequency conversion stage is configured to frequency-double the fourth harmonic light, e.g., by configuring the stage to include a cavity that resonates at the fourth harmonic frequency and configuring the linear crystal to generate eighth harmonic light having a frequency equal to eight times the fundamental frequency. In some embodiments, the final frequency conversion stage utilizes a beam splitter to reflect the eighth harmonic portion of the light exiting the linear crystal as the laser output light, and to pass an unconsumed fourth harmonic portion of the light exiting the linear crystal for circulation in the final stage. To generate eighth harmonic output light at approximately 133 nm, the linear crystal includes two or more stacked SBO crystal plates having inverted crystal axes oriented substantially parallel to a polarization direction of the fourth harmonic input light, where the thickness of each plate in the light propagation direction (i.e., spacing between poles of the periodic structure) is substantially equal to an odd multiple of a quasi-phase-matching critical length approximately equal to 0.13 μm (i.e., in the range of 0.11 μm and 0.15 μm) to achieve QPM for the fourth harmonic frequency and the eighth harmonic frequency, thereby generating laser output light having an output wavelength of approximately 133 nm.

In accordance with the laser assemblies and associated methods described herein with reference to a second specific embodiment, laser output light with an output frequency having a wavelength of approximately 177 nm is produced by way of generating a first fundamental light having a first fundamental frequency, utilizing the first fundamental light to generate a second harmonic of the first fundamental light, summing the second harmonic of the first fundamental light with a second fundamental light having a second fundamental frequency, utilizing the summing product as intermediate light that is then passed to the final frequency conversion stage. In one embodiment each of the first and second fundamental frequencies have corresponding wavelengths in the range of approximately 1000 nm to approximately 1100 nm, whereby a wavelength of the intermediate light beam (i.e., the summing product) is approximately equal to a third harmonic of the first fundamental frequency. According to an aspect of the second embodiment, approximately sixth harmonic output light may be generated from the intermediate (approximately third harmonic) light beam by configuring the final frequency conversion stage as a frequency doubling cavity that resonates at the third harmonic frequency, and configuring the stacked SBO crystal plates of the linear crystal having spacing between poles substantially equal to twice an odd multiple of a quasi-phase-matching critical length substantially equal to 0.60 μm (i.e., in the range of 0.59 μm and 0.61 μm) to achieve QPM of the third harmonic frequency and the sixth harmonic frequency, thereby generating laser output light having an output wavelength of approximately 177 nm.

In accordance with a third specific embodiment, laser output light is generated with an output wavelength of approximately 152 nm by creating a seventh harmonic of a fundamental frequency by configuring the final frequency conversion stage to sum third and fourth harmonics of the fundamental frequency. In this case, the third harmonic frequency is generated using two (first and second) fundamental light beams having substantially equal (first and second) fundamental frequencies, with the first fundamental frequency being used to generate a second harmonic, then summing a first portion of the second harmonic with the second fundamental frequency, and the fourth harmonic is generated by doubling a second portion of the second harmonic. The final frequency conversion (summing) stage may be configured as a cavity that resonates at the third harmonic frequency, which serves as a first intermediate light beam that is circulated and passed through the nonlinear crystal. The fourth harmonic serves as a second intermediate light beam that is provided directly to an input surface of the nonlinear crystal such that both the third and fourth harmonic light pass along parallel paths through the nonlinear crystal. According to an aspect of the third embodiment, approximately seventh harmonic output light having an output wavelength of approximately 152 nm is generated by configuring the stacked SBO crystal plates of the linear crystal such that a spacing between poles of the periodic structure is based on a critical length substantially equal to 0.30 μm (i.e., in the range of 0.29 μm to 0.31 μm).

In accordance with a fourth specific embodiment, laser output light is generated with an output wavelength of approximately 152 nm is produced by configuring the final frequency conversion stage to sum second and fifth harmonics of a fundamental frequency. A first frequency doubling stage is utilized to generate second harmonic light having a frequency that is two times the fundamental frequency, and a first portion of this second harmonic light forms a first intermediate light beam provided to the final frequency conversion (summing) stage. The fifth harmonic light, which forms a second intermediate light beam provided to the final frequency conversion (summing) stage, is generated by frequency doubling a second portion of the second harmonic light to generate fourth harmonic light, and then summing the fourth harmonic light with the fundamental frequency. The final frequency conversion (summing) stage may include a cavity that is configured to resonate at the second harmonic frequency, and the fifth harmonic is directed through an input surface of the nonlinear crystal in parallel with the second harmonic. According to an aspect of the fourth embodiment, approximately seventh harmonic output light having an output wavelength of approximately 152 nm is generated by configuring the stacked SBO crystal plates of the linear crystal such that a spacing between poles of the periodic structure is based on a critical length substantially equal to 0.34 μm (i.e., in the range of 0.33 μm to 0.35 μm).

In accordance with a fifth specific embodiment, laser output light is generated with an output wavelength of approximately 177 nm is produced by configuring the final frequency conversion stage to sum second and fourth harmonics of a fundamental frequency. A first frequency doubling stage is utilized to generate a first intermediate light beam having a frequency that is substantially equal to two times the fundamental frequency. A second frequency doubling stage is utilized to generate second harmonic light having a frequency that is two times the fundamental frequency, and a third frequency doubling stage is utilized to receive the second harmonic light and to generate fourth harmonic light (second intermediate light beam) having a frequency that is four times the fundamental frequency. The final frequency conversion (summing) stage may include a cavity configured to resonate at the second harmonic frequency, and the fourth harmonic light directed through an input surface of the nonlinear crystal in parallel with the second harmonic. According to an aspect of the fifth embodiment, approximately sixth harmonic output light having an output wavelength of approximately 177 nm is generated by configuring the stacked SBO crystal plates of the linear crystal using a critical length substantially equal to 0.66 μm (i.e., in the range of 0.65 μm to 0.67 μm).

In one embodiment, an inspection system configured to inspect a sample such as a wafer, reticle or photomask includes one of the lasers described herein that generates an output wavelength of approximately 177 nm, 152 nm or approximately 133 nm.

DETAILED DESCRIPTION OF THE DRAWINGS

Figure 1:
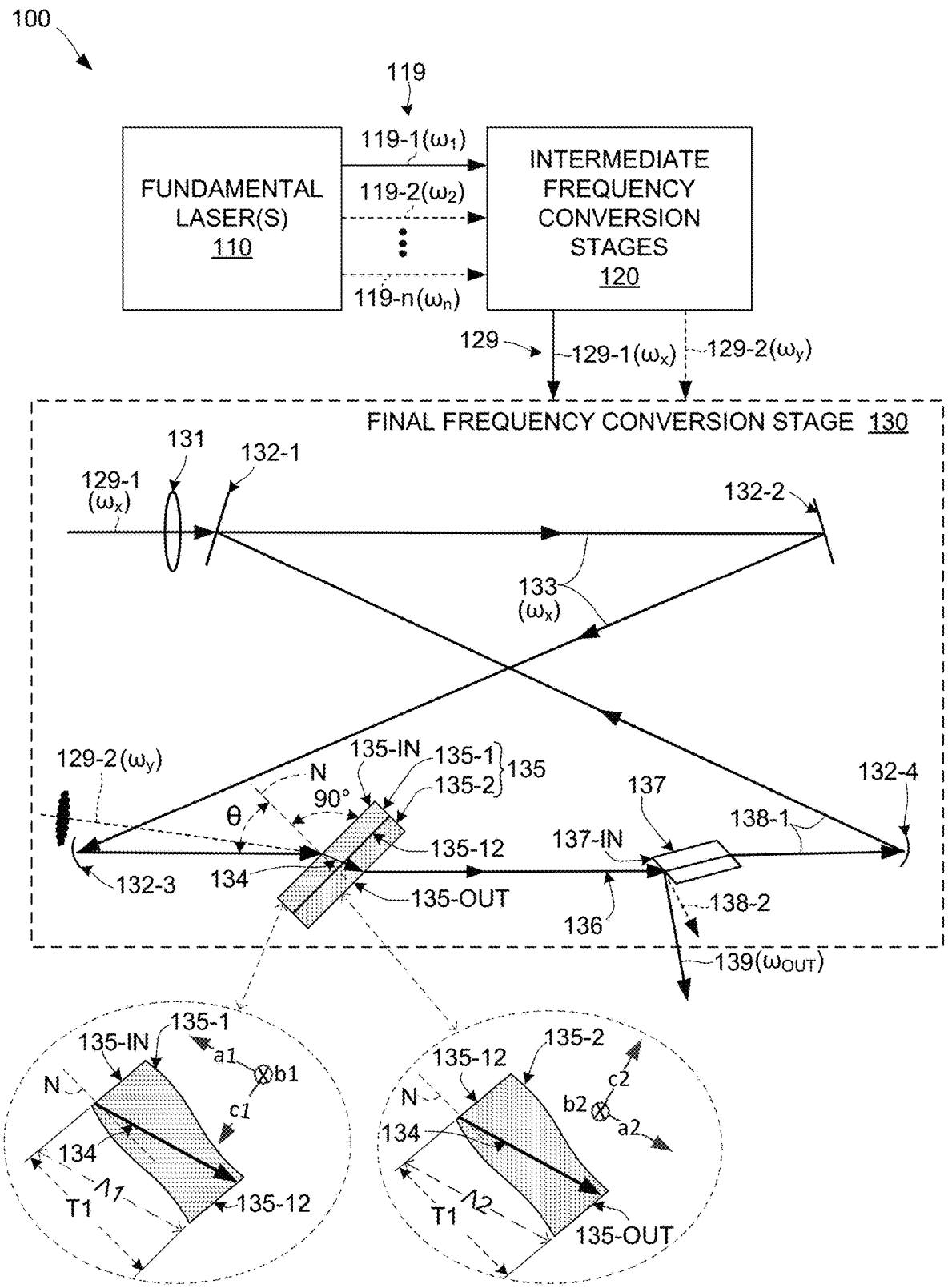
FIG. 1 is a simplified block diagram showing an exemplary laser assembly according to a generalized exemplary embodiment of the present invention.

The present invention relates to an improvement in lasers for semiconductor inspection systems. The following description is presented to enable one of ordinary skill in the art to make and use the invention as provided in the context of a particular application and its requirements. As used herein, directional terms such as "top", "left", "right", "horizontal" and "downward" are intended to provide relative positions for purposes of description and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Second-order susceptibility variation in acentric crystals leads to modification of the quasi-phase-matching (QPM) conditions which can be useful for frequency conversion. For the VUV spectral region below about 150 nm, there is not yet a known transparent optical crystal that combines non-zero second order nonlinearity with sufficient birefringence. Some attempts to fabricate QPM structures have been reported, for instance, by electric-field poling of the ferroelectric $BaMgF_4$ which has mm2 symmetry (E. G. Villora, K. Shimamura, K. Sumiya, and H. Ishibashi, "Birefringent- and quasi phase-matching with $BaMgF_4$ for vacuum-UV/ UV and mid-IR all solid-state lasers," Opt. Express 17, 12362 (2009)), or by mechanical twinning of crystalline quartz ($SiO_2$) which has trigonal 32 symmetry (S. Kurimura, M. Harada, K. Muramatsu, M. Ueda, M. Adachi, T. Yamada, and T. Ueno, "Quartz revisits nonlinear optics: twinned crystal for quasi-phase matching [Invited]," Opt. Mat. Express 1, 1367 (2011)); however, both materials exhibit low nonlinear coefficients and the shortest wavelength demonstrated so far is 194 nm.

Strontium tetraborate $SrB_4O_7$ (SBO) crystallizes in the orthorhombic system, point group mm2, space group $Pnm2_1$, with unit cell dimensions a=4.4255 Å, b=10.709 Å, and c=4.2341 Å (Y. S. Oseledchik, A. L. Prosvirnin, A. I. Pisarevskiy, V. V. Starshenko, V. V. Osadchuk, S. P. Belokrys, N. V. Svitanko, A. S. Korol, S. A. Krikunov, and A. F. Selevich, "New nonlinear optical crystals: strontium and lead tetraborates," Opt. Mater. 4, 669 (1995)). All boron atoms are coordinated tetrahedrally and an oxygen atom is common to three tedrahedra. Despite the three-dimensional network of tetrahedral, the borate network appears as a layer-like structure since there are relatively fewer links in the c direction of the unit cell.

SBO exhibits very small birefringence (<0.005) and is not ferroelectric. Non-phase-matched second-harmonic generation (SHG) has been implemented using SBO for diagnostics, but the efficiency is extremely low when only one coherence length is utilized and a practical detection limit was estimated to be 2 μJ for 120 fs pulses at 267 nm (V. Petrov, F. Noack, D. Shen, F. Pan, G. Shen, X. Wang, R. Komatsu, and V. Alex, "Application of the nonlinear crystal $SrB_4O_7$ for ultrafast diagnostics converting to wavelengths as short as 125 nm," Opt. Lett. 29, 373 (2004)).

SBO exhibits unique optical and mechanical properties. The transparency range of SBO is 130-3200 nm in wavelength (Y. S. Oseledchik et al., op. cit.). SBO also exhibits a high (1.5-3.5 pm/V) value of the diagonal $d_{33}$ element (compared to the band-gap value). The optical damage threshold is very high (14.7 $GW/cm^2$) compared with other materials such as $MgF_2$. The microhardness of SBO is also high (1750 $kg/mm^2$ in the x direction, 1460 $kg/mm^2$ in the y direction and 1350 $kg/mm^2$ in the z direction). The high optical damage threshold and microhardness allow SBO crystals to withstand extreme conditions when exposed to DUV and VUV radiation. DUV and VUV lasers may have high power levels from several milli-watts (mW) to several watts (W) or more, and high photon energy (for example, 9.32 eV at 133 nm and 8.16 eV at 152 nm). The broad transparency range, the good damage resistivity and chemical stability, and high value of the diagonal $d_{33}$ element are features that make SBO very attractive for frequency conversion to generate DUV and VUV wavelengths. However, the low birefringence means that frequency doubling by critical or non-critical phase matching are not possible.

Trabs et al. (P. Trabs, F. Noack, A. S. Aleksandrovsky, A. I. Zaitsev, N. V. Radionov, and V. Petrov, "Spectral fringes in non-phase-matched SHG and refinement of dispersion relations in the VUV", Opt. Express 23, 10091 (2015)) reported using an SBO crystal to generate second harmonics in the VUV from ultrashort laser pulses through random quasi phase matching. The second harmonic generation method described by Trabs et al. is unsuitable for a light source semiconductor metrology and inspection systems because the frequency conversion process has low efficiency making it impractical to use this method to generate Watts of second harmonic laser power, and also because it requires ultrashort laser pulses.

FIG. 1 shows a laser assembly 100 for generating a laser output light beam 139 having an output frequency $\omega_{OUT}$ with a corresponding wavelength in the range of approximately 125 nm to approximately 183 nm. Laser assembly 100 generally includes one or more fundamental lasers 110, two or more intermediate frequency conversion stages 120 and a final frequency conversion stage 130.

Referring to the upper left portion of FIG. 1, fundamental lasers 110 are respectively configured to generate fundamental light beams 119-1, 119-2 . . . 119-n (collectively indicated as 119) having corresponding fundamental frequencies $\omega_1$ to $\omega_n$, where each frequency has a corresponding fundamental wavelength between about 1 μm and 1.1 μm. In some embodiments all fundamental light beams 119 have substantially the same wavelength (e.g., fundamental frequency $\omega_1$ is substantially equal to fundamental frequency $\omega_2$). Specific fundamental laser types are mentioned in the specific embodiments provided below.

Intermediate frequency conversion stages 120 are optically coupled to receive one or more of fundamental light beams 119 (or light from an associated intermediate frequency conversion stage) and are collectively configured to generate one or more intermediate light beams 129. In some specific embodiments intermediate light beams 129 comprise a single (first) intermediate light beam 129-1 having an associated intermediate frequency $\omega_x$. In other specific embodiments intermediate light beams 129 include both intermediate light beam 129-1 and a second intermediate light beam 129-2 having an associated intermediate frequency $\omega_y$. FIG. 1 is not intended to limit the appended claims such that all intermediate frequency conversion stages 120 are required to receive a fundamental light beam 119. For example, in the specific examples below set forth below, a given "downstream" intermediate frequency conversion stage may receive second, third or fourth harmonic light generated by one or more "upstream" intermediate frequency conversion stages that is/are optically coupled between a fundamental laser 110 and the given downstream stage.

Referring to the lower half of FIG. 1, laser assembly 100 also includes a final frequency conversion stage 130 configured to pass intermediate light beams 129 ($\omega_x$ or $\omega_x$ and $\omega_y$) through a nonlinear crystal 135, and to direct laser output light beam 139 out of laser assembly 100 for use, e.g., in one or more of the inspection systems described below with reference to FIGS. 8-10. In one embodiment, intermediate light beam 129-1, which has a frequency $\omega_x$ as described in the specific embodiments set forth below, enters a bow-tie ring cavity formed by an input coupler mirror 132-1, a flat mirror 132-2, two curved mirrors 132-3 and 132-4, SBO linear crystal 135 and a beam splitter 137. For descriptive purposes, a portion of the light transmitted by the bow-tie ring cavity from input/coupler mirror 132-1 to linear crystal 135 is indicated as circulated light portion 133, which is composed of both intermediate light beam 129-1 and unconsumed circulated light portion 138-1 (generated as described below), where both light portions 133 and 138-1 have frequency $\varphi_x$. In one embodiment, a mode matching lens 131 is utilized to focus intermediate light beam 129-1 though input coupler/mirror 132-1, and the bow-tie ring cavity formed by mirrors 132-1 to 132-4 is otherwise configured such that light portion 133 is directed at a selected angle θ relative to surface normal N (i.e., perpendicular to input surface 135-IN) onto nonlinear crystal 135, and such that a beam waist of light portion 133 (i.e., including intermediate light beam 129-1) occurs at (i.e., inside or proximate to) nonlinear crystal 135. When intermediate light beam 129-2 having frequency $\omega_y$ is used as described in relevant specific embodiments set forth below, intermediate light beam 129-2 enters the bow-tie ring cavity passing close to (but not necessarily through) curved mirror 132-3 such that it is directed substantially at selected angle θ onto input surface 135-IN and passes through linear crystal 135. As illustrated in this exemplary arrangement, final frequency conversion stage 130 is configured to pass intracrystal light 134 (i.e., only light portion 133, or both light portion 133 and intermediate light beam 129-2) through nonlinear crystal 135, with exiting light 136 (i.e., the total light exiting linear crystal 135) being directed onto an input surface 137-IN of a beam splitter 137. Beam splitter 137 is configured to split exiting light 136 such that unconsumed input light 138-1 having frequency $\omega_x$ is passed to mirror 132-4 for recirculation within the bow-tie cavity and such that laser output light 139 having output frequency $\omega_{OUT}$ is directed out of laser assembly 100. As indicated, in some embodiments beam splitter 137 is also configured to reflect unconsumed input light 138-1 having frequency $\omega_y$ out of the bow-tie cavity. Beam splitter 137 may be implemented using one of a single SBO crystal, SBO glass or a $CaF_2$ crystal.

SBO crystal plates 135-1 and 135-2 are cooperatively configured to form a periodic structure that achieves quasi-phase-matching (QPM) of intermediate light beams 129 with laser output 139 (i.e., between $\omega_{OUT}$ and either frequency $\omega_x$ alone, as depicted, or both frequencies $\omega_x$ and $\omega_y$, as described in some of the specific examples set forth below) such that light portion 136 exiting output surface 135-OUT of nonlinear crystal 135 includes laser output light beam 139 having a desired output frequency $\omega_{OUT}$. Referring to the bubble sections at the bottom of FIG. 1, SBO crystal plates 135-1 and 135-2 are configured such that crystal axis a1-b1-c1 of SBO crystal plate 135-1 is inverted (i.e., rotated by substantially 180°) with respect to crystal axis a2-b2-c2 of adjacent SBO crystal plate 135-2. In addition, nonlinear crystal 130 is configured within final frequency conversion stage 130 such that one or both intermediate light beams 129 propagate in a direction parallel to the a-axes of both SBO crystal plates (i.e., parallel to axis a1 of SBO crystal plate 135-1 and parallel to axis a2 of SBO crystal plate 135-2), and such that a spacing between poles of at least one SBO crystal plate (i.e., either spacing Λ1, which is the distance traveled by light between the opposing surfaces of SBO crystal plate 135-1, or spacing Λ2, which is the distance traveled by light between the opposing surfaces of SBO crystal plate 135-2) is determined by:

$$\Lambda = mL_c \quad \text{(Equation 1)}$$

where m is an odd integer (e.g., 1, 3, 5, 7 . . . ) and quasi-phase-matching critical length $$L_c = \frac{\pi}{\Delta k},$$

where Δk is defined by:

$$\Delta k = k(\omega_{OUT}) - k(\omega_x) - k(\omega_y) \quad \text{(Equation 2)}$$

where k(ω) is the wavevector of light of frequency ω in nonlinear crystal 135. In embodiments where only intermediate light beam 129-1 is present, then $\omega_y$ in this equation should be replaced by $\omega_x$, i.e.:

$$\Delta k = k(\omega_{OUT}) - 2k(\omega_x) \quad \text{(Equation 3)}.$$

Note that the spacing between poles in each periodic structure is sometimes referred to as thickness herein because spacing Λ1 is substantially equal to physical thickness T1 of SBO crystal plate 135-1, and spacing Λ2 is substantially equal to physical thickness T2 of SBO crystal plate 135-1, where thicknesses T1 and T2 are measured parallel to the light propagation direction of intra-crystal light portion 134 between the opposing plate surfaces. In one embodiment, nonlinear crystal 135 is produced by polishing a large SBO plate to the desired thickness, then dividing it into individual smaller pieces that are assembled in the correct orientations (described below) relative to one another to form stacked SBO crystal plates, where connection between adjacent SBO crystal plates is achieved by optically contacting the polished surfaces together. In this case, all SBO crystal plates forming a given nonlinear crystal have the same thickness (e.g., thickness T1 equals thickness T2) and thus the stacked crystal plates form a periodic structure in which the spacing between each pole is the same (e.g., spacing Λ1 is substantially equal to spacing Λ2). In another alternative embodiment, the crystal axes of SBO crystal plates 135-1 and 135-2 may be oriented such that light 134 propagates parallel to the b-axis, or at some angle within an a-b plane of the two crystal plates.

Figure 2A:
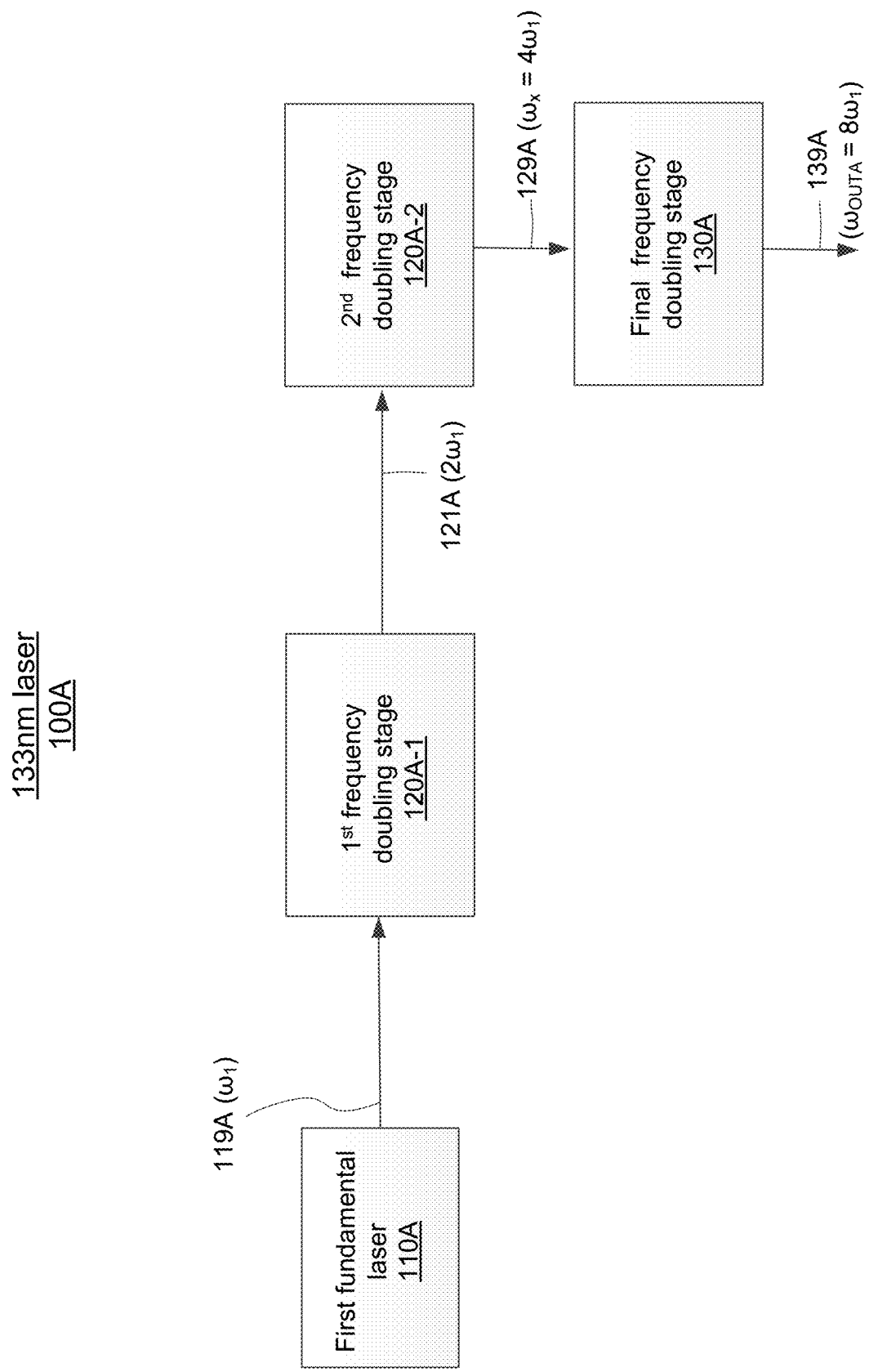
FIGS. 2A and 2B are simplified block diagrams respectively showing simplified laser assemblies according to first and specific embodiments of the present invention.

FIG. 2A is a simplified block diagram showing an exemplary laser assembly 100A configured to generate a wavelength in the range of approximately 128 nm to approximately 134 nm (e.g., approximately 133 nm) according to a first specific exemplary embodiment of the present invention. Laser assembly 100A comprises a first fundamental laser 110A and three frequency doubling (conversion) stages (i.e., two intermediate frequency doubling stages 120A-1 and 120A-2, and a final frequency doubling stage 130A) that are cooperatively configured to generate laser output light having a wavelength in the range of approximately 128 nm to approximately 134 nm. The first fundamental laser 110A is configured to generate fundamental light 119A having a first fundamental wavelength in the range of approximately 1000 nm to approximately 1100 nm (i.e., between about 1 μm and 1.1 μm) and a corresponding first fundamental frequency $\omega_1$. First intermediate frequency doubling stage 120A-1 receives the first fundamental light 119A and generates the second harmonic light 121A with a second harmonic frequency $2\omega_1$ equal to twice the first fundamental frequency $\omega_1$. Second intermediate frequency doubling stage 120A-2 receives the second harmonic light 121A and generates an intermediate light beam 129A as fourth harmonic light with the fourth harmonic frequency $4\omega_1$ equal to four times the first fundamental frequency $\omega_1$. Final (third) frequency doubling stage 130A receives the fourth harmonic light (intermediate light beam) 129A and generates laser output light 139A with an output frequency $\omega_{OUTA}$ that is equal to eight times the first fundamental frequency $\omega_1$.

Referring to FIG. 2A, the first fundamental laser 110A is configured using known techniques to generate the first fundamental light 119A (referred to simply as the "fundamental" in the industry) at first fundamental frequency $\omega_1$. In one embodiment, the first fundamental laser 110A is configured such that the first fundamental light 119A is generated at a first fundamental frequency $\omega_1$ corresponding to an infra-red wavelength of approximately 1064 nm. In an exemplary embodiment, the first fundamental laser 110A is implemented using one of a Nd:YAG (neodymium-doped yttrium aluminum garnet) lasing medium, a Nd-doped yttrium orthovanadate (Nd:YVO$_4$) lasing medium, or an ytterbium-doped fiber lasing medium. Suitable fundamental lasers are commercially available from Coherent Inc., IPG Photonics Corporation and other manufacturers. Such manufacturers also sell lasers generating light having a wavelength near 532 nm, i.e., the laser includes first fundamental laser 110A and the first frequency doubling stage 120A-1. In order to generate sufficient light at a wavelength of approximately 133 nm for inspecting semiconductor wafers or reticles, first fundamental laser 110A should generate tens or hundreds of Watts or more of fundamental light 119A.

According to an exemplary embodiment in FIG. 2A, each of the frequency doubling stages 120A-1 and 120A-2 comprises an external resonant cavity including at least three optical mirrors and a nonlinear crystal arranged therein, respectively. The cavities can be stabilized with standard PDH (Pound-Drever-Hall), HC (Hänsch-Couillaud) or other locking techniques. The cavity length is adjusted to maintain resonance by adjusting the position of a mirror or prism through a control signal. The first frequency doubling stage 120A-1 receives and converts first fundamental light 119A at the first fundamental frequency $\omega_1$ to generate the second harmonic light 121A at two times the first fundamental frequency ($2\omega_1$). Second frequency doubling stage 120A-2 receives and converts second harmonic light 121A to generate fourth harmonic light 129A at four times the first fundamental frequency ($4\omega_1$).

In some other embodiments (not shown), the first frequency doubling module may be combined with the first fundamental laser to use intra-cavity frequency doubling with the NLO crystal placed inside the fundamental solid-state laser cavity to generate the second harmonic light 121A.

In a preferred embodiment, the first frequency doubling stage 120A-1 in FIG. 2A that generates the second harmonic light 121A can include a Lithium triborate (LBO) crystal, which can be substantially non-critically phase-matched (for an appropriate choice of crystal plane) at temperatures between room temperature and about 200° C. for producing a second harmonic in a wavelength range between about 515 nm and about 535 nm. In alternative embodiments, the first frequency doubling stage 120A-1 may include a Cesium Lithium Borate (CLBO) crystal or a beta-Barium Borate (BBO) crystal, either of which can be critically phase matched for generating a second harmonic in a wavelength range between about 515 nm and about 535 nm. In other alternative embodiments, the first frequency doubling stage 120A-1 may include a KTiOPO$_4$ (KTP), periodically poled lithium niobate (PPLN), periodically poled stoichiometric lithium tantalate (PPSLT), or other nonlinear crystal for frequency conversion.

The second frequency doubling stage 120A-2 that generates the fourth harmonic may use critical phase matching in CLBO, BBO or other non-linear crystal. In preferred embodiments, the second frequency doubling stage 120A-2 includes a hydrogen-treated or deuterium-treated CLBO crystal.

Figure 4:
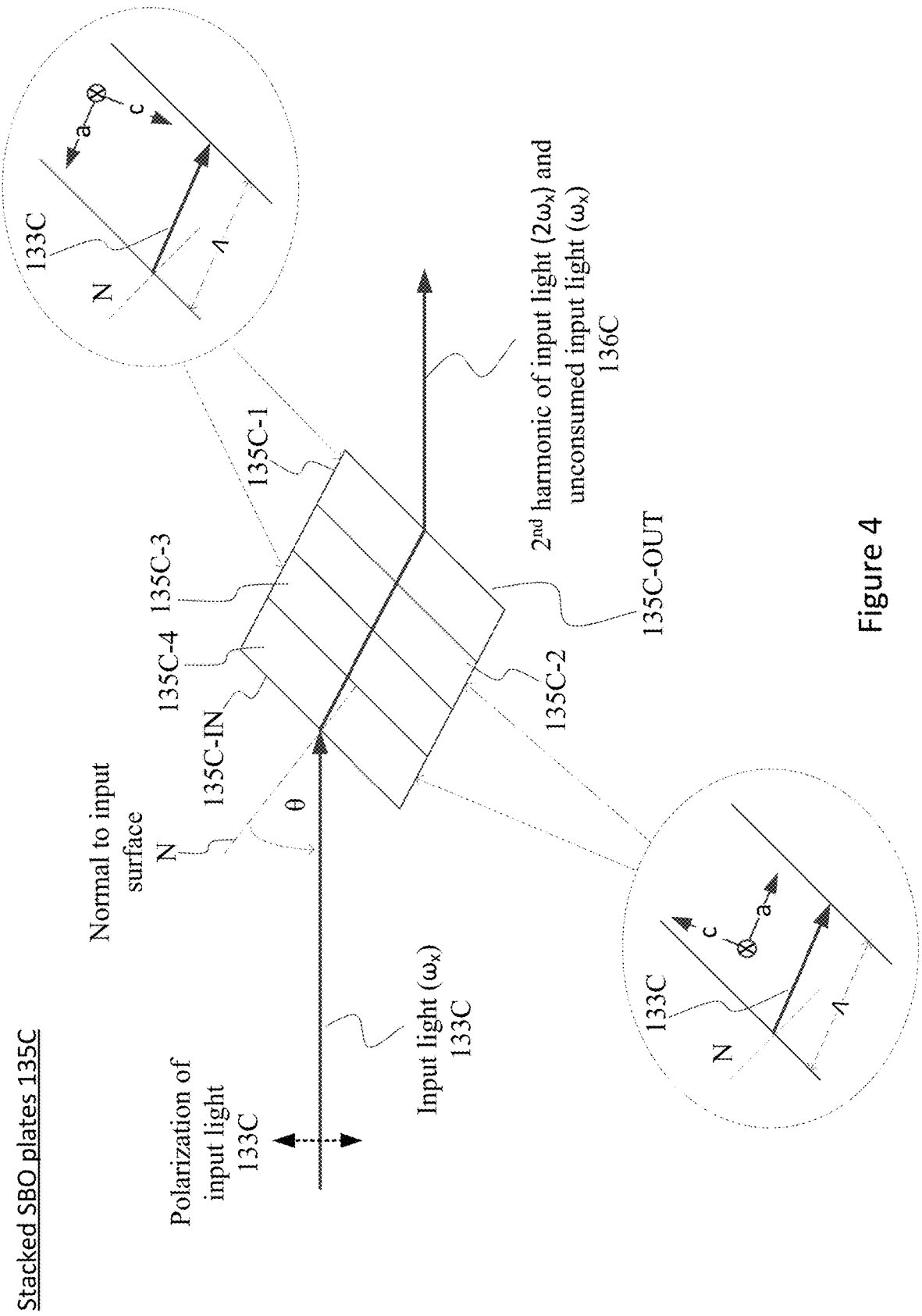
FIG. 4 is a simplified diagram showing an exemplary nonlinear crystal configured for use in the final frequency doubling stage of FIG. 3.

In an alternative embodiment, the second frequency doubling stage 120A-2 that generates the fourth harmonic may use quasi-phase-matching (QPM) in stacked SBO plates configured as depicted in FIG. 4 below. The critical length for QPM for generating 266 nm from 532 nm in SBO is approximately 2.80 μm (i.e. in a range from 2.79 μm to 2.90 μm). Since the critical length is longer than the critical lengths for generating shorter wavelengths, the SBO plate thickness in the light propagation direction (Λ in FIG. 4) may be equal to the critical length or may be equal to a small, odd integer (such as between 3 and 19) times the critical length.

Further details of how a fourth harmonic of a CW fundamental IR laser can be generated with high power, low noise, and good stability, can be found in U.S. Pat. Nos. 9,293,882 and 9,660,409, to Chuang, and U.S. Pat. Nos. 9,509,112 and 10,044,166 to Chuang et al. These patents are incorporated herein by reference.

Referring to FIG. 2A, the final frequency doubling stage 130A receives the fourth harmonic light 129A and generates the eighth harmonic light 139A with the eighth harmonic frequency $8\omega_1$ equal to eight times the first fundamental frequency $\omega_1$. In a preferred embodiment, the final frequency doubling stage 130A in FIG. 2A that generates the eighth harmonic light 139A can include two or more SBO crystal plates configured for quasi-phase-matching (QPM). For instance, in the case of two SBO crystal plates, the crystal plates are placed rotated 180° to one another such that their crystal axes are inverted with respect to each other. This physical arrangement of the crystal plates allows for QPM. This may be considered as analogous to using PPLN (periodically poled lithium niobate) for QPM except that Lithium Niobate is a ferroelectric crystal and can be periodically poled. In contrast, SBO is non-ferroelectric, so we need to physically arrange the crystal plates to create a periodic structure for QPM. Furthermore, periodic poling requires applying an electric field parallel to a crystal axis of a ferroelectric crystal, so the poling direction is necessarily aligned with a crystal axis. In contrast, the SBO crystal plates disclosed herein can be cut and polished in any orientation relative to the crystal axes, so allowing the crystal plates to be cut and oriented, for example, at Brewster's angle relative to the light incident on the plates. See FIGS. 4 and 7 and their associated descriptions below.

Any of the frequency conversion stages may be enclosed in one or more protective environments, such as those described in U.S. Pat. No. 8,298,335, entitled "Enclosure for controlling the environment of optical crystals", by Armstrong. This patent is incorporated by reference herein. In particular, since the final frequency doubling stage 130A generates a VUV wavelength, this stage needs to be in an environment with very low oxygen and water concentrations (preferably a few ppm or lower concentrations). Preferably the final frequency doubling stage is kept in an environment that is purged with pure nitrogen or argon. Note that a single protective environment may enclose multiple stages or a single stage.

Any of the frequency conversion stages may incorporate any of the methods or systems described in U.S. Pat. Nos. 9,461,435 and 9,059,560, both entitled "Alleviation of laser-induced damage in optical materials by suppression of transient color centers formation and control of phonon population", to Dribinski et al., any of the apparatus or methods described in U.S. Pat. No. 8,824,514, entitled "Measuring crystal site lifetime in a non-linear optical crystal", to Armstrong, and any of the apparatus and methods described in U.S. Pat. No. 8,976,343, entitled "Laser crystal degradation compensation" to Genis. All of these patents are incorporated herein by reference.

Further note that any of the intermediate frequency conversion stages mentioned herein may advantageously use deuterium, hydrogen and/or fluorine doped or treated non-linear crystals. Such crystals may be created, processed or treated by any of the processes or methods described in U.S. Pat. No. 9,023,152 to Dribinski, U.S. Pat. Nos. 9,250,178, 9,459,215 and 10,283,366 to Chuang et al., and Published U.S. Patent Application 2014/0305367, entitled "Passivation of Nonlinear Optical Crystals", and filed on Apr. 8, 2014 by Dribinski et al. These patents and applications are incorporated herein by reference. The doped or treated crystals may be particularly useful in those stages involving deep UV wavelengths, including the second frequency doubling stage 120A-2 in FIG. 2A.

Figure 2B:
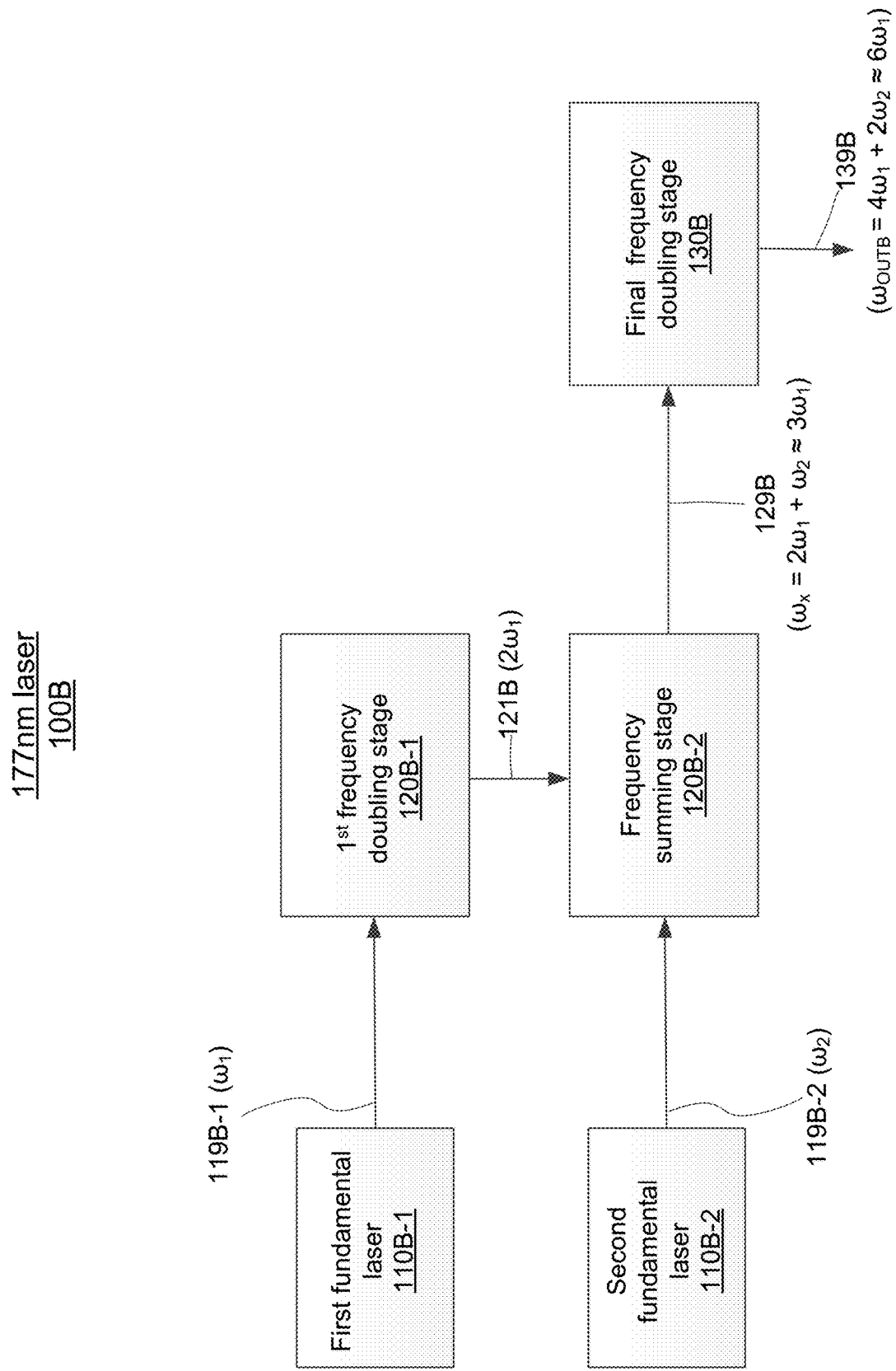

FIG. 2B is a simplified block diagram showing an exemplary laser assembly 100B configured to generate a wavelength in the range of approximately 170 nm to approximately 180 nm (e.g., approximately 177 nm) according to a second specific embodiment of the present invention. Laser assembly 100B comprises a first fundamental laser 110B-1, a second fundamental laser 110B-2, a frequency doubling (conversion) stage 120B-1, a frequency summing (conversion) stage 120B-2, and a final frequency doubling stage 130B that are collectively configured to generate laser output light 139B with an output frequency $\omega_{OUTB}$ having a wavelength in the range of approximately 170 nm to approximately 180 nm. The first fundamental laser 110B-1 is configured to generate fundamental light 119B-1 having a first fundamental wavelength in the range of approximately 1000 nm to approximately 1100 nm (i.e., between about 1 μm and 1.1 μm) and a corresponding first fundamental frequency $\omega_1$. The second fundamental laser 110B-2 is configured to generate fundamental light 119B-2 having a second fundamental wavelength in the range of approximately 1000 nm to approximately 1100 nm (i.e., between about 1 μm and 1.1 μm) and a corresponding second fundamental frequency $\omega_2$. Frequency doubling stage 120B-1 receives the first fundamental light 119B-1 and generates the second harmonic light 121B with a second harmonic frequency $2\omega_1$ equal to twice the first fundamental frequency $\omega_1$. Frequency summing stage 120B-2 sums the second harmonic 121B with the second fundamental light 119B-2 and generates intermediate light beam 129B having summing frequency $2\omega_1+\omega_2$. If the frequencies of the first fundamental laser 110B-1 and the second fundamental laser 110B-2 are the same ($\omega_1=\omega_2$) the intermediate light beam 129B is the third harmonic ($3\omega_1$ or $3\omega_2$) of the fundamental light. Final frequency doubling stage 130B receives the intermediate light beam 129B and generates final output light 139B with output frequency $\omega_{OUTB}$ equal to twice the summing frequency $2\omega_1+\omega_2$, i.e. equal to $4\omega_1+2\omega_2$. If the frequencies of the first fundamental laser 110B-1 and the second fundamental laser 110B-2 are the same ($\omega_1=\omega_2$) then output frequency $\omega_{OUTB}$ of final laser output light 139B is the sixth harmonic ($6\omega_1$ or $6\omega_2$) of the fundamental light.

Referring to FIG. 2B, the first and second fundamental lasers 110B-1 and 110B-2 are configured as described above with reference to fundamental laser 110A in FIG. 2A. In an alternative embodiment, second fundamental laser 110B-2 may be omitted, and the output of first fundamental laser 110B-1 may be divided into two portions: a first portion directed to first frequency doubling stage 120B-1, and a second portion directed to frequency summing stage 120B-2 along with second harmonic light 121B. In this alternative embodiment, necessarily $\omega_2=\omega_1$.

According to the exemplary embodiment in FIG. 2B, the first frequency doubling stage 120B-1 is configured as described above with reference to stages 120A-1 and 120A-2 of FIG. 2A.

In one embodiment, frequency summing stage 120B-2 sums the second harmonic 121B with the second fundamental light 119B-2 using a Lithium triborate (LBO) crystal, a Cesium Lithium Borate (CLBO) crystal or a beta-Barium Borate (BBO) crystal.

In a preferred embodiment, final frequency doubling stage 130B includes two or more SBO crystal plates configured for quasi-phase-matching (QPM) in a manner similar to that described above with reference to final frequency doubling stage 130A of FIG. 2A. Differences between final frequency doubling stages 130A and 130B are set forth below with reference to FIGS. 3 and 4.

Figure 3:
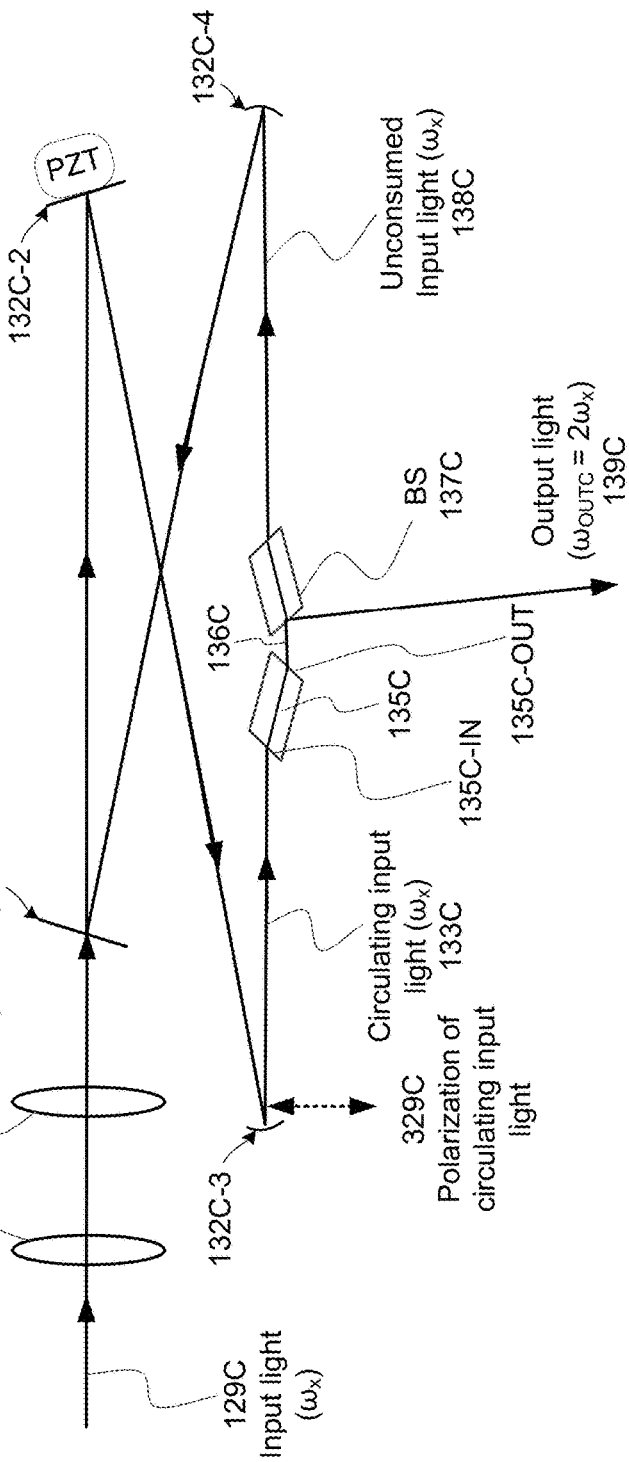
FIG. 3 is a simplified diagram showing an exemplary final frequency doubling stage utilized in the laser assemblies of the first and second specific embodiments according to an exemplary embodiment of the present invention.

FIG. 3 is a simplified diagram showing an exemplary final frequency doubling stage 130C utilized in the 133 nm laser assembly 100A of FIG. 2A and in the 177 nm laser assembly 100B of FIG. 2B according to exemplary embodiments of the present invention. Input light 129C with frequency $\omega_x$ (for example, $\omega_x=4\omega_1$ when stage 130C is used in the 133 nm laser 100A, or $\omega_x=2\omega_1+\omega_2$ when stage 130B is used in the 177 nm laser 100B) enters a bow-tie ring cavity comprising input coupler 132C-1, flat mirror 132C-2, curved mirrors 132C-3, 132C-4 and a nonlinear crystal 135B having two or more SBO crystal plates (including an input surface 135C-IN and an output surface 135C-OUT) through input coupler 132C-1 and is recirculated to enhance the power. Exiting light 136C, which is output from nonlinear crystal 135C through output surface 135C-OUT, comprises unconsumed input light 138C and generated laser output light 139C with an output frequency $\omega_{OUTC}$ that is equal to twice the frequency of the input light 129C (i.e., frequency $\omega_{OUTC}$ can be either equal to the eighth harmonic output light 139A of FIG. 2A or the sixth harmonic output light 139B of FIG. 2B). The laser output light 139C is reflected from the surface of beam splitter (BS) 137C and directed out of the cavity.

Preferably, nonlinear crystal 135C is configured so that input surface 135C-IN and output surface 135C-OUT are oriented approximately at Brewster's angle relative to the circulating input light 133C. The polarization direction of the circulating input light 133C is illustrated by arrow 329C. Furthermore, BS 137C may be configured to laterally displace the circulating input light 133C in the cavity by an amount that substantially offsets the lateral displacement of the input light caused by the nonlinear crystal 135C, so as to maintain a substantially symmetric bow-tie cavity and simplify optical alignment of the cavity.

In one embodiment, BS 137C may comprise an SBO crystal, SBO glass or a $CaF_2$ crystal. Since SBO has good deep UV transmission and has a high damage threshold, SBO may advantageously be used as a substrate material for the BS 137C to ensure long life in spite of the high-power level of the unconsumed input light 133C circulating in the cavity. If BS 137C comprises an SBO crystal, its thickness and/or the orientation of its crystal axes may be configured so as to minimize any frequency doubling of the unconsumed input light 133C passing through it. BS 137C may comprise a dichroic beam splitter, prism or other component to separate the wavelengths. In one embodiment, nonlinear crystal 135C is configured so that output light 139C has orthogonal polarization relative to circulating input light 133C. In this embodiment, BS 137C may comprise a polarizing beam splitter configured to transmit unconsumed input light 138C and reflect output light 139C. Note that in this embodiment, it will not be possible to take advantage of the largest nonlinear coefficient, $d_{33}$, so this configuration will trade off reduced conversion efficiency for the convenience of using a polarized beam splitter. In one embodiment, BS 137C has its surfaces oriented so that the unconsumed input light 138C is substantially p-polarized relative to those surfaces and the surfaces are at approximately Brewster's angle relative to that unconsumed input light.

According to FIG. 3, the input light ($\omega_x$) 129C is focused by one or more lenses 131C before entering the cavity to match the intrinsic mode of the resonant cavity that has a beam waist inside or proximate to nonlinear crystal 135C. In a preferred embodiment, one or more lenses 131C include one or more cylindrical lenses comprising SBO glass or crystal and configured to operate at approximately Brewster's angle relative to the incoming light 129C so as to minimize reflection losses without using an antireflection coating. SBO is a suitable material for such lenses as it has high damage threshold at UV and DUV wavelengths. Unconsumed input light 138C ($\omega_x$) light passing through BS 137C gets reflected by mirror 132C-4 and circulates inside the cavity to build up the intensity. If the enhanced input light ($\omega_x$) power density is intense enough, the conversion efficiency from the input light ($\omega_x$) to output light 139C ($2\omega_x$) may be very high, up to or even higher than 50%. Output light 139C ($2\omega_x$) with a wavelength near 177 nm or near 133 nm exits the cavity after reflection from the BS 137C.

In an alternative embodiment, the input surface of nonlinear crystal 135C may be coated with an appropriate anti-reflection coating instead of orienting the input surface 135C-IN and output surface 135C-OUT at Brewster's angle.

Although FIG. 3 depicts final frequency doubling stage 130C as including a cavity comprising two flat mirrors and two curved mirrors, other combinations of mirrors and/or lenses may be used to refocus the light circulating in the cavity. In an alternative embodiment, final frequency doubling stage 130C may comprise a delta cavity, a standing-wave cavity, or other shaped cavity instead of a bow-tie cavity. If a standing-wave cavity is used, the eighth harmonic is generated in the same direction as the injected fourth harmonic light. Any of these cavities can be stabilized with standard PDH or HC locking techniques. The cavity length is adjusted to maintain resonance by adjusting the position of one of the mirrors (such as mirror 132C-2 in FIG. 3) or the position of a prism, through a control signal (not shown) connected to a piezo-electric transducer (PZT), voice coil or another actuator. Note that when final frequency doubling stage 130C is used in a pulsed laser, no cavity is needed, and input light 129C may be directed to, and focused in or proximate to, nonlinear crystal 135C by any suitable combination of lenses and/or mirrors.

FIG. 4 illustrates details of a nonlinear crystal 135C including four stacked SBO plates 135C-1 to 135C-4 configured to double the frequency of the summing product of a second harmonic of a first fundamental light and a second fundamental light in the case of the 177 nm laser 100B or to double the frequency of a fourth harmonic to generate an eighth harmonic in the case of the 133 nm laser 100A. There may be an odd or even number of plates. Although FIG. 4 illustrates nonlinear crystal 135C having a periodic structure including four stacked SBO crystal plates 135C-1 to 135C-4, the total number of SBO plates may be as few as two or may be more than ten. The thickness of each of the SBO plates 135C-1 to 135C-4 may be ten microns to two millimeters. Concretely, the SBO plate thickness $\Lambda$ is given by $\Lambda = mL_c$ where m is an odd integer (i.e., 1, 3, 5, 7 . . . ) and quasi-phase-matching critical length $$L_c = \frac{\pi}{\Delta k}.$$

For the final frequency doubling stage 130B of 177 nm laser 100B the quasi-phase-matching critical length $L_c$ is about 0.60 μm, whereas for the final frequency doubling stage 130A of 133 nm laser 100A the quasi-phase-matching critical length $L_c$ is about 0.13 μm. A reasonable m may be on the order of hundreds or thousands to achieve a convenient slab thickness for handling and processing. The exemplary QPM critical length for generating 133 nm light by frequency-doubling 266 nm light was calculated from the refractive indices of SBO at wavelengths of 133 nm and 266 nm using the Sellmeier model published by Trabs et al. (op cit.). Since Trabs et al. did not generate any wavelengths shorter than 160 nm, the extrapolated refractive index at 133 nm may be inaccurate. One skilled in the relevant arts would understand how to calculate the QPM critical length given more accurate refractive indices.

Referring to FIG. 4, input light 133C of frequency $\omega_x$ is incident on input surface 135C-IN of nonlinear crystal 135C. The polarization direction of the input light 133C is illustrated by the dashed-line-arrow. The SBO plates 135C-1 to 135C-4 are stacked on top of one another so that input surface 135C-IN and output surface 135C-OUT are oriented approximately at Brewster's angle θ relative to the circulating light 133C of frequency $\omega_x$ so as to minimize reflection losses without using an antireflection coating. Brewster's angle is approximately 60.5±1° with respect to the surface normal N for wavelengths longer than about 210 nm. The light 136C exiting the stack of SBO plates comprises the second harmonic of the input light $2\omega_x$ and unconsumed input light $\omega_x$.

In order to create a periodic structure for QPM, SBO plates 135C-1 to 135C-4 are placed with one rotated relative to the other such that their corresponding c crystal axes are inverted with respect to each other as shown in the two insets of FIG. 4. The surface normal N of the SBO plate of thickness $\Lambda$ (where $\Lambda$ is the spacing between poles in the crystal) and the propagation direction of light 133C inside the SBO plate are shown in the two insets. This physical arrangement of the crystal plates allows for QPM. This may be considered as analogous to using PPLN (periodically poled lithium niobate) for QPM except that Lithium Niobate is a ferroelectric crystal and can be periodically poled. In contrast, SBO is non-ferroelectric, so we need to physically arrange the crystal plates to create a periodic structure for QPM.

Furthermore, periodic poling requires applying an electric field parallel to a crystal axis of a ferroelectric crystal, so the poling direction is necessarily aligned with a crystal axis. In contrast, the SBO crystal plates disclosed herein can be cut and polished in any orientation relative to the crystal axes, so allowing the crystal plates to be cut and oriented at Brewster's angle relative to the light incident on the plates.

In a preferred embodiment, the crystal axes of SBO plates 135C-1 to 135C-4 are oriented such that light 133C propagating inside the SBO plates propagates substantially perpendicular to the c-axis with a polarization direction (electric field direction) of light 133C substantially parallel to the c-axis to take advantage of $d_{33}$ being the largest non-linear optical coefficient of SBO and hence maximize conversion efficiency. For example, as depicted in FIG. 4, the crystal axes of SBO plate 135C-1 may be oriented such that light 133C propagates substantially parallel to the a-axis of the SBO crystal. Alternatively, the crystal axes may be oriented such that light 133C propagates parallel to the b-axis (not depicted), or at some angle within an a-b plane of the crystal. In other words, the crystal axes depicted in the two insets in FIG. 4 may be rotated about the c-axis. If the input surface of SBO plate 135C-1 is oriented at Brewster's angle with respect to input light 133C, then the direction of propagation of the light within plate 135C-1 will be approximately 29.5±1° relative to surface normal N.

Figure 5A:
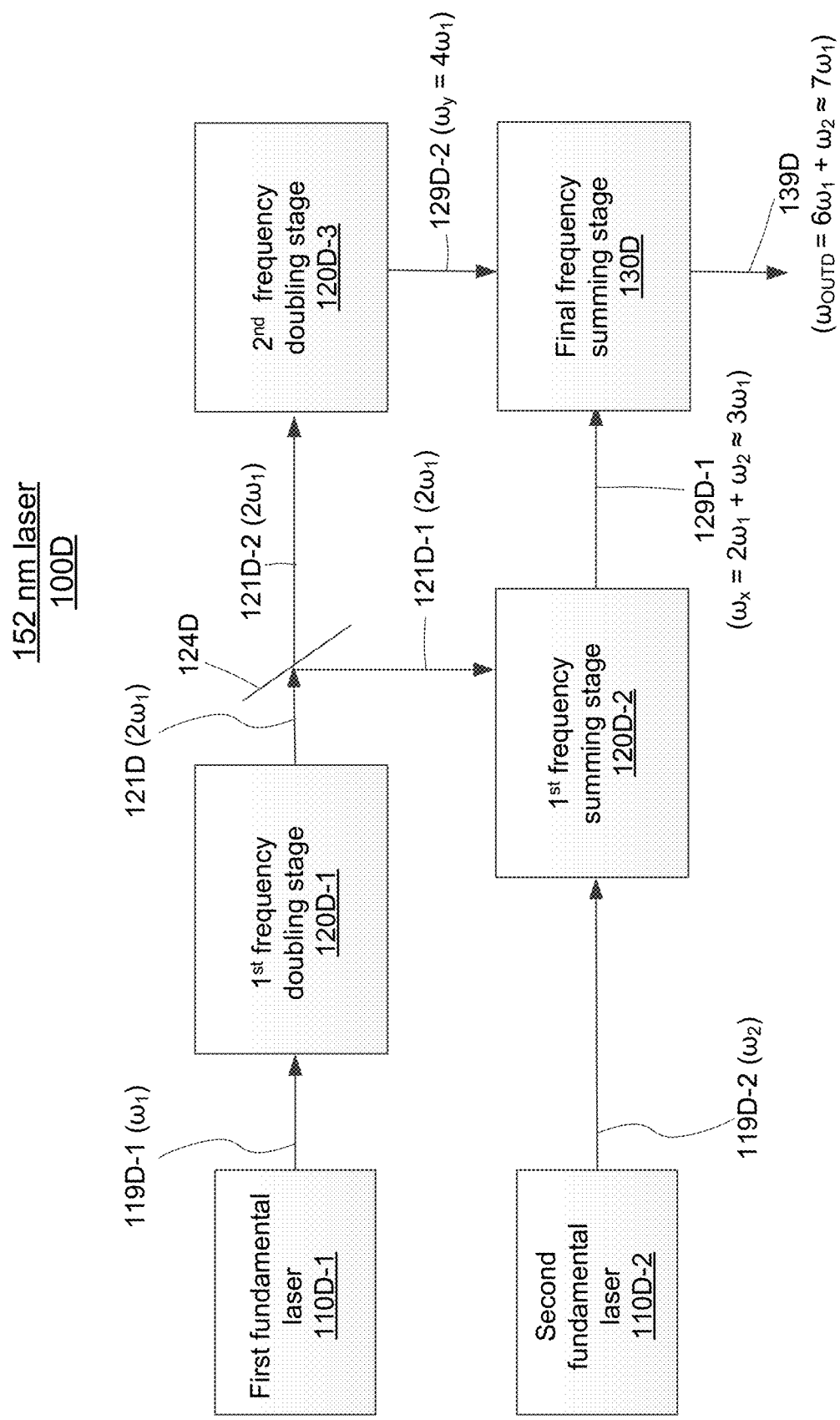
FIGS. 5A, 5B and 5C are simplified block diagrams respectively showing simplified laser assemblies according to third, fourth and fifth specific embodiments of the present invention.

FIG. 5A is a simplified block diagram showing an exemplary laser assembly 100D according to a third specific exemplary embodiment of the present invention. Laser assembly 100D includes a first fundamental laser 110D-1, a second fundamental laser 110D-2, three intermediate frequency conversion stages (i.e., a first frequency doubling stage 120D-1, a frequency summing stage 120D-2 and a second frequency doubling stage 120D-3) and a final frequency summing (conversion) stage 130D that are cooperatively configured to generate laser output light 139D having a wavelength in the range of approximately 147 nm to approximately 155 nm (e.g., approximately 152 nm). First fundamental laser 110D-1 is configured in the manner described above to generate (first) fundamental light 119D-1 having a first fundamental wavelength in the range of approximately 1000 nm to approximately 1100 nm (i.e., between about 1 μm and 1.1 μm) and a corresponding first fundamental frequency $\omega_1$. Second fundamental laser 110D-2 is also configured in the manner described above to generate (second) fundamental light 110D-2 having a second fundamental wavelength in the range of approximately 1000 nm to approximately 1100 nm (i.e., between about 1 μm and 1.1 μm) and a corresponding second fundamental frequency $\omega_2$. First frequency doubling stage 120D-1 receives the first fundamental light 119D-1 and generates second harmonic light 121D with a second harmonic frequency $2\omega_1$ equal to twice the first fundamental frequency $\omega_1$. A beam splitter 124D separates the second harmonic light 121D into two portions: a first portion 121D-1 and a second portion 121D-2. First portion 121D-1 of second harmonic light 121D is received by frequency summing stage 120D-2, which sums first portion 121D-1 with second fundamental light 119D-2 to generate a first intermediate light beam 129D-1 having a corresponding frequency $\omega_x$ that is equal to the summing frequency $2\omega_1 + \omega_2$. For convenience, this summing frequency is referred to herein as substantially equal to a third harmonic (since $\omega_1$ and $\omega_2$ are similar or approximately equal). That is, when the frequencies of the first fundamental laser 110D-1 and the second fundamental laser 110D-2 are substantially the same (i.e., $\omega_1 = \omega_2$) then frequency $\omega_x$ of first intermediate light beam 129D-1 is substantially equal to the third harmonic of either fundamental light frequencies $\omega_1$ or $\omega_2$ (i.e., $\omega_x \approx 3\omega_1$ or $\omega_x \approx 3\omega_2$). Frequency summing stage 120D-2 is configured in a manner similar to that described above for frequency summing stage 120B-2 with reference to FIG. 2B. Second portion 121D-2 of second harmonic light 121D is passed to second frequency doubling stage 120D-3, which is configured to generate a second intermediate light beam 129D-2 having corresponding frequency $\omega_y$ equal to equal to four times the first fundamental frequency $\omega_1$ (i.e., $\omega_y=4\omega_1$). According to the exemplary embodiment in FIG. 1, each of the frequency doubling stages 120D-1 and 120D-3 comprises an external resonant cavity including at least three optical mirrors and a nonlinear crystal arranged therein in a manner similar to that described above with reference to second frequency doubling stage 120A-2 in FIG. 2A. Final frequency summing stage 130D uses techniques described herein to sum the first and second intermediate light beams 129D-1 and 129D-2 (i.e., $\omega_x+\omega_y$) and to generate laser output light 139D with an output frequency $\omega_{OUTD}$ that is equal to $6\omega_1+\omega_2$, which is referred to herein as substantially equivalent to seventh harmonic light (i.e., because when $\omega_1$ and $\omega_2$ are similar or approximately equal, $\omega_x+\omega_y=6\omega_1+\omega_2\approx7\omega_1$), which in a preferred embodiment has a wavelength of approximately 152 nm. In an alternative embodiment, second fundamental laser 110D-2 may be omitted, and the output of first fundamental laser 110D-1 may be divided into two portions: a first portion directed to first frequency doubling stage 120D-1, and a second portion directed to frequency summing stage 120D-2 along with second harmonic light 121D-1. In this alternative embodiment, necessarily $\omega_2=\omega_1$.

Figure 5B:
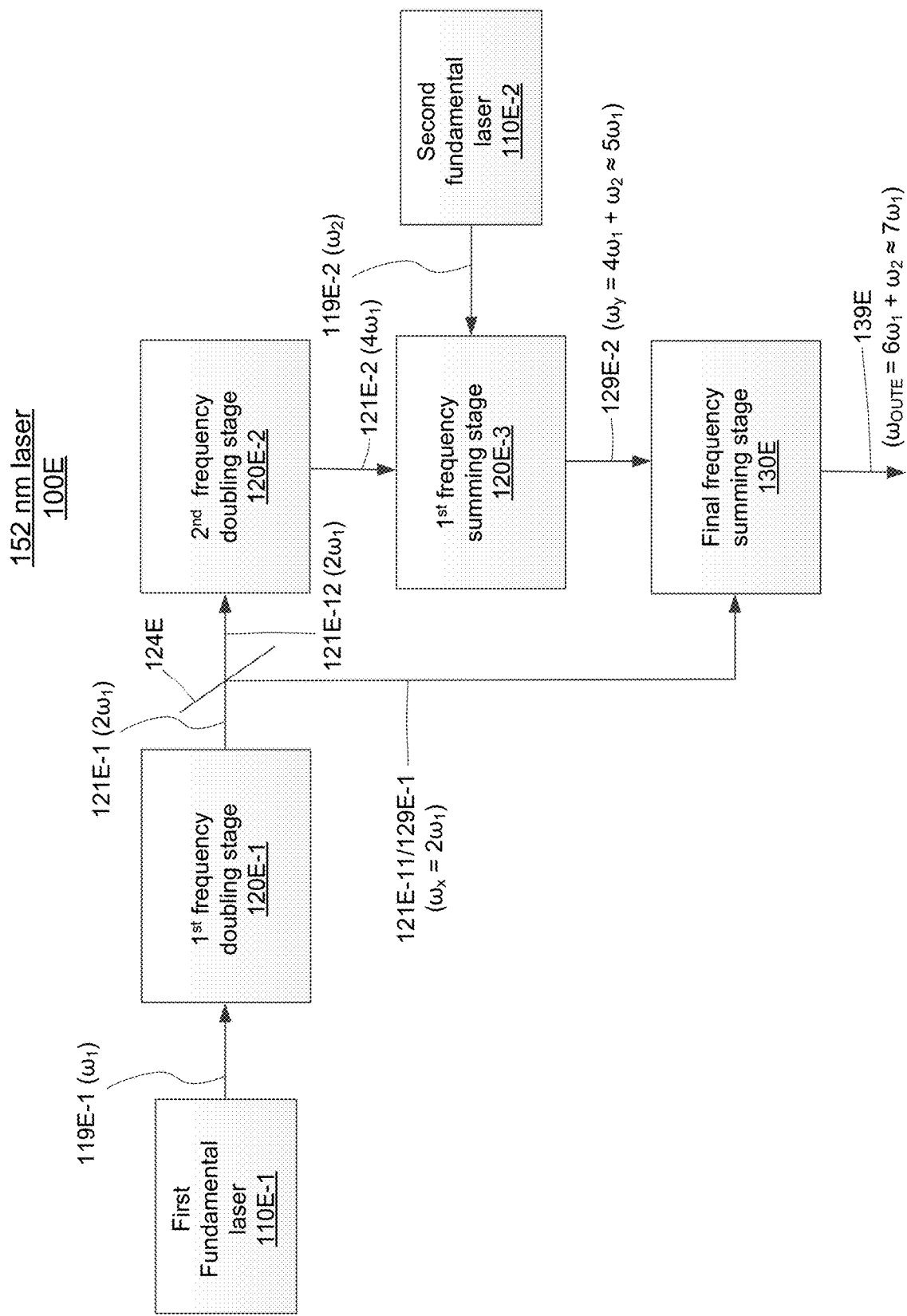

FIG. 5B is a simplified block diagram showing an exemplary laser assembly 100E configured to generate a wavelength in the range of approximately 147 nm to approximately 155 nm (e.g., approximately 152 nm) according to a fourth specific exemplary embodiment of the present invention. Laser assembly 100E comprises a first fundamental laser 110E-1, a second fundamental laser 110E-2, three intermediate frequency conversion stages (i.e., a first frequency doubling stage 120E-1, a second frequency doubling stage 120E-2, and a first frequency summing stage 120E-3) and a final frequency summing (conversion) stage 130E to generate laser output light with an output frequency $\omega_{OUTE}$ having a wavelength in the range of approximately 147 nm to approximately 155 nm (e.g., approximately 152 nm). Fundamental lasers 110E-1 and 110E-2 are configured in the manner described above to respectively generate fundamental light 119E-1 and 119E-2 having fundamental wavelengths in the range of approximately 1000 nm to approximately 1100 nm (i.e., between about 1 μm and 1.1 μm) and corresponding fundamental frequencies $\omega_1$ and $\omega_2$, respectively. First frequency doubling stage 120E-1 receives first fundamental light 119E-1 and generates the second harmonic light 121E-1 with a second harmonic frequency $2\omega_1$ equal to twice the first fundamental frequency $\omega_1$. Beam splitter 124E separates second harmonic light 121E-1 into two portions: a first portion 121E-11 and a second portion 121E-12. First portion 121E-11 of second harmonic light 121E-1 is utilized as a first intermediate light beam 129E-1 having a corresponding frequency $\omega_x$ that is passed directly to final frequency summing stage 130E. Second frequency doubling stage 120E-2 receives second portion 121E-12 of second harmonic light 121E-1 and generates fourth harmonic light 121E-2 with a fourth harmonic frequency $4\omega_1$ equal to four times the first fundamental frequency $\omega_1$. First frequency summing stage 120E-3 sums the fourth harmonic light 121E-2 with the second fundamental light 119E-2 and generates a second intermediate light beam 129E-2 having a corresponding frequency $\omega_y$ equal to the summing frequency $4\omega_1+\omega_2$. For convenience, this summing frequency is referred to herein as fifth harmonic light (i.e., because when $\omega_1$ and $\omega_2$ are similar or approximately equal, the sum of the fourth harmonic of the first fundamental frequency and the second fundamental frequency is substantially equal to the fifth harmonic of the first fundamental frequency, or $\omega_y=4\omega_1+\omega_2\approx5\omega_1$). Final frequency summing stage 130 sums the first and second intermediate light beams 129E-1 and 129E-2 and generates laser output light 139E with an output frequency $\omega_{OUTE}$ being equal to summing frequency $6\omega_1+\omega_2$, which is referred to for convenience herein as substantially equal to the seventh harmonic of first fundamental frequency $\omega_1$ (i.e., if $\omega_1\approx\omega_2$, then $\omega_x+\omega_y=6\omega_1+\omega_2\approx7\omega_1$), which in a preferred embodiment has a wavelength of approximately 152 nm. In an alternative embodiment, second fundamental laser 110E-2 may be omitted, and the output of first fundamental laser 110E-1 may be divided into two portions: a first portion directed to first frequency doubling stage 120E-1, and a second portion directed to first frequency summing stage 120E-3 along with fourth harmonic light 121E-2. In this alternative embodiment, necessarily $\omega_2=\omega_1$.

Figure 7:
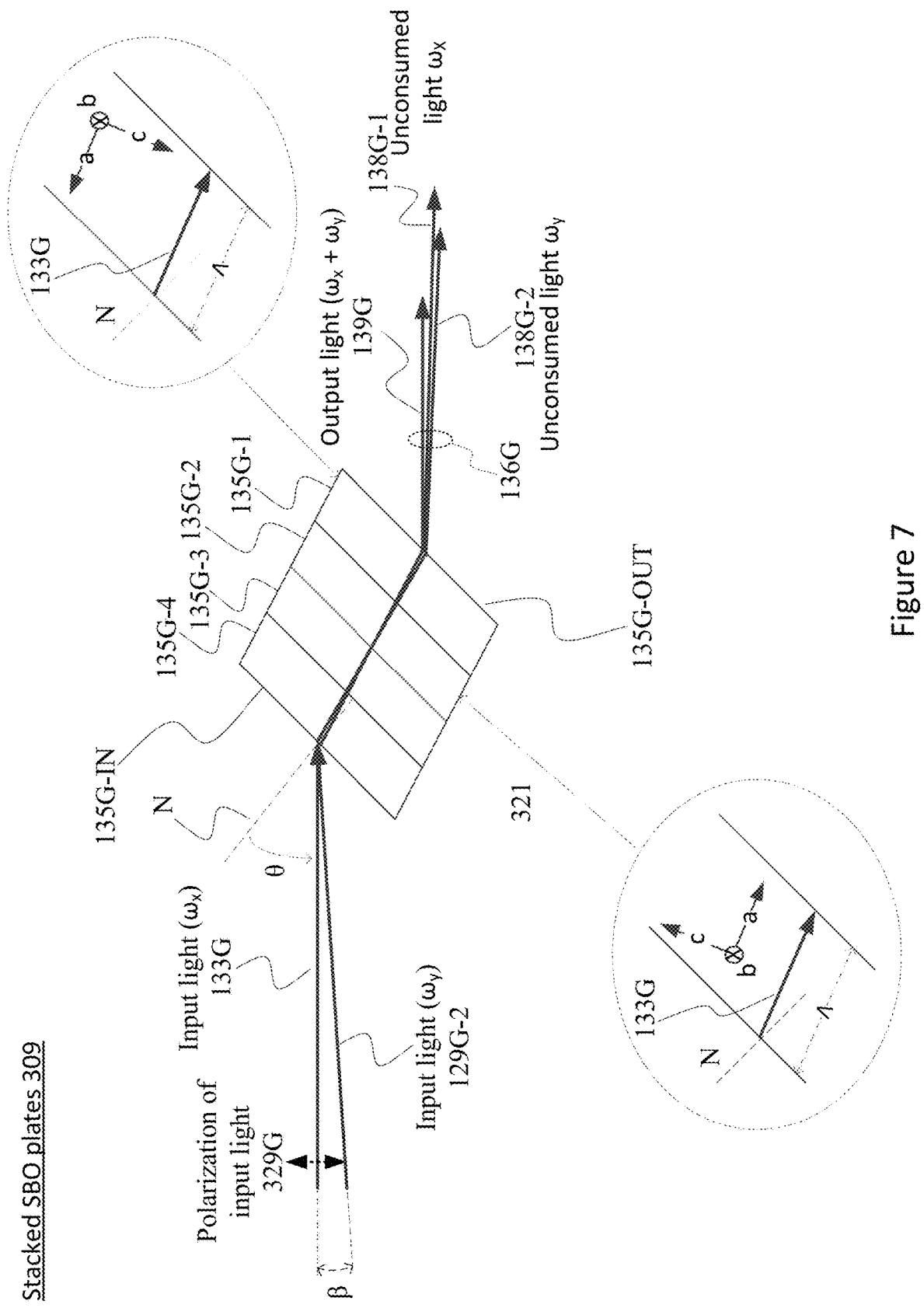
FIG. 7 is a simplified diagram showing an exemplary nonlinear crystal configured for use in the final frequency doubling stage of FIG. 8.

The first frequency summing stage 120E-3 may be configured to use CLBO or hydrogen or deuterium-treated CLBO in a nearly non-critical phase matched configuration to sum fourth harmonic light 121E-2 with second fundamental light 119E-2. Alternatively, the first frequency summing stage 120E-3 may use quasi-phase-matching (QPM) in stacked SBO plates configured as depicted in FIG. 7 below. The critical length for QPM for generating 213 nm by summing 266 nm and 1064 nm in SBO is approximately 1.81 μm (i.e. in a range from 1.80 μm to 1.82 μm). Since this critical length is longer than the critical lengths for generating shorter wavelengths, the SBO plate thickness in the light propagation direction (Λ in FIG. 7) may be equal to the critical length or may be equal to a small, odd integer (such as between 3 and 19) times the critical length.

Figure 5C:
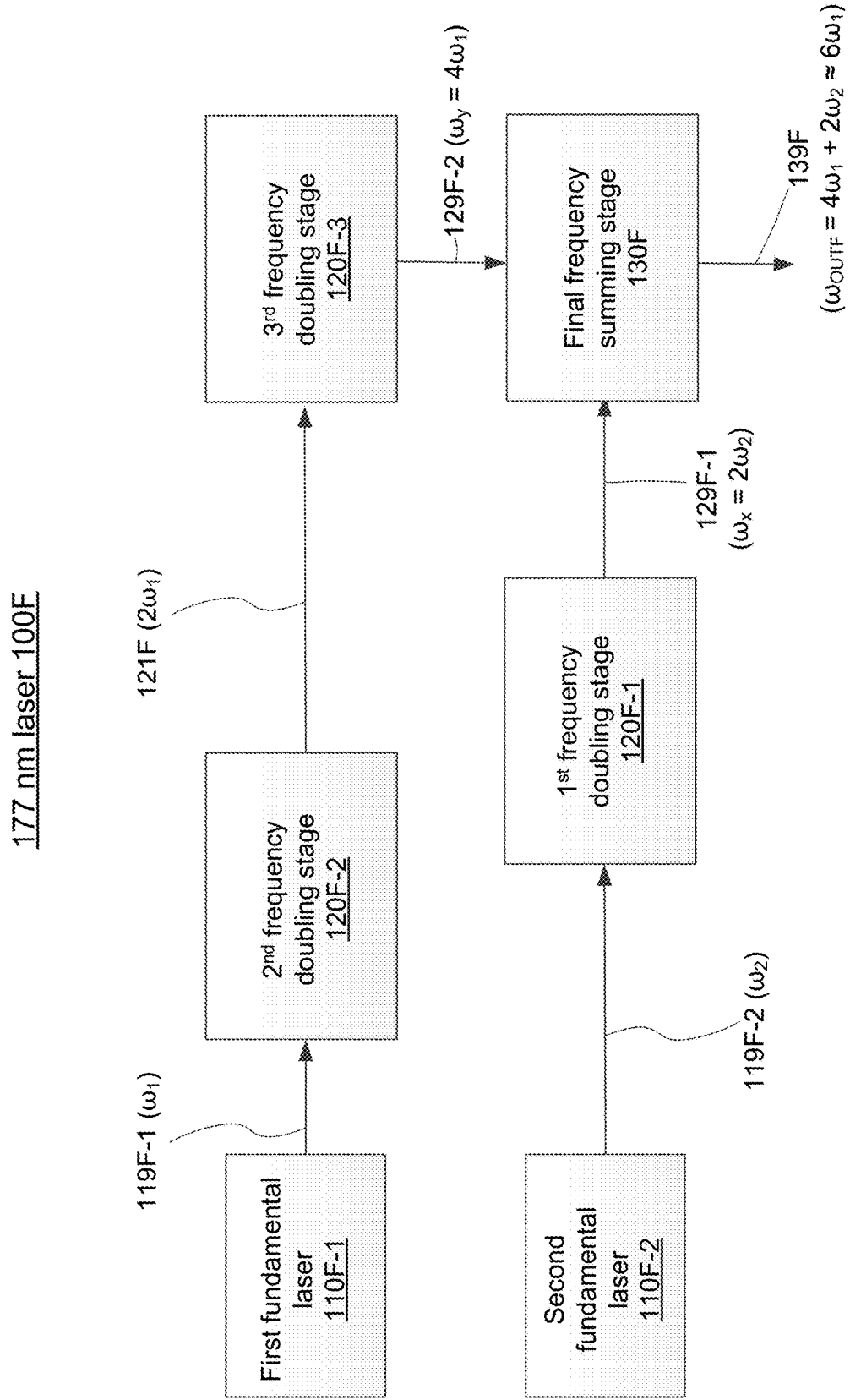

FIG. 5C is a simplified block diagram showing an exemplary laser assembly 100F according to a fifth specific exemplary embodiment of the present invention. Laser assembly 100F comprises a first fundamental laser 110E-1, a second fundamental laser 110E-2, three intermediate frequency conversion stages (i.e., a first frequency doubling stage 120E-1, a second frequency doubling stage 120E-2, and a third frequency doubling stage 120E-3), and a final frequency summing (conversion) stage 130F that are cooperatively configured to generate laser output light having a wavelength in the range of approximately 170 nm to approximately 180 nm (e.g., approximately 177 nm). Fundamental lasers 110E-1 and 110E-2 are configured in the manner described above to respectively generate fundamental light 119F-1 and 119F-2 having fundamental wavelengths in the range of approximately 1000 nm to approximately 1100 nm (i.e., between about 1 μm and 1.1 μm) and corresponding fundamental frequencies $\omega_1$ and $\omega_2$, respectively. First frequency doubling stage 120E-1 receives second fundamental light 119F-2 and generates a first intermediate light beam 129F-1 having a frequency $\omega_x$ equal to a second harmonic of the second fundamental frequency $\omega_2$ (i.e., equal to twice the second fundamental frequency $\omega_2$). Second frequency doubling stage 120E-2 receives first fundamental light 119F-1 and generates second harmonic light 121F having a frequency equal to a second harmonic of first fundamental frequency $\omega_1$ (i.e., equal to twice the first fundamental frequency $\omega_1$). Third frequency doubling stage 120E-3 receives second harmonic light 121F and generates a second intermediate light beam 129F-2 having a frequency $\omega_y$ with a fourth harmonic frequency $4\omega_1$ equal to four times the first fundamental frequency $\omega_1$. Final frequency summing stage 130F sums first intermediate light beam 129F-1

(i.e., second harmonic $2\omega_2$) and second intermediate light beam 129F-2 (i.e., fourth harmonic $4\omega_1$) and generates laser output light 139F having an output frequency $\omega_{OUTF}$ that is substantially equal to six times the first fundamental frequency (i.e., because when ω1 approximately equals $\omega_2$, $\omega_x+\omega_y=4\omega_1+2\omega_2\approx6\omega_1$), which in a preferred embodiment has a wavelength of approximately 177 nm. In an alternative embodiment, second fundamental laser 110E-2 and $1^{st}$ frequency doubling stage 120E-1 may be omitted, and the output 121F of second frequency doubling stage 120E-2 may be divided into two portions: a first portion directed to third frequency doubling stage 120E-3, and a second portion directed to final frequency summing stage 130F along with fourth harmonic light 129F-2. In this alternative embodiment, necessarily $\omega_2=\omega_1$.

Figure 6:
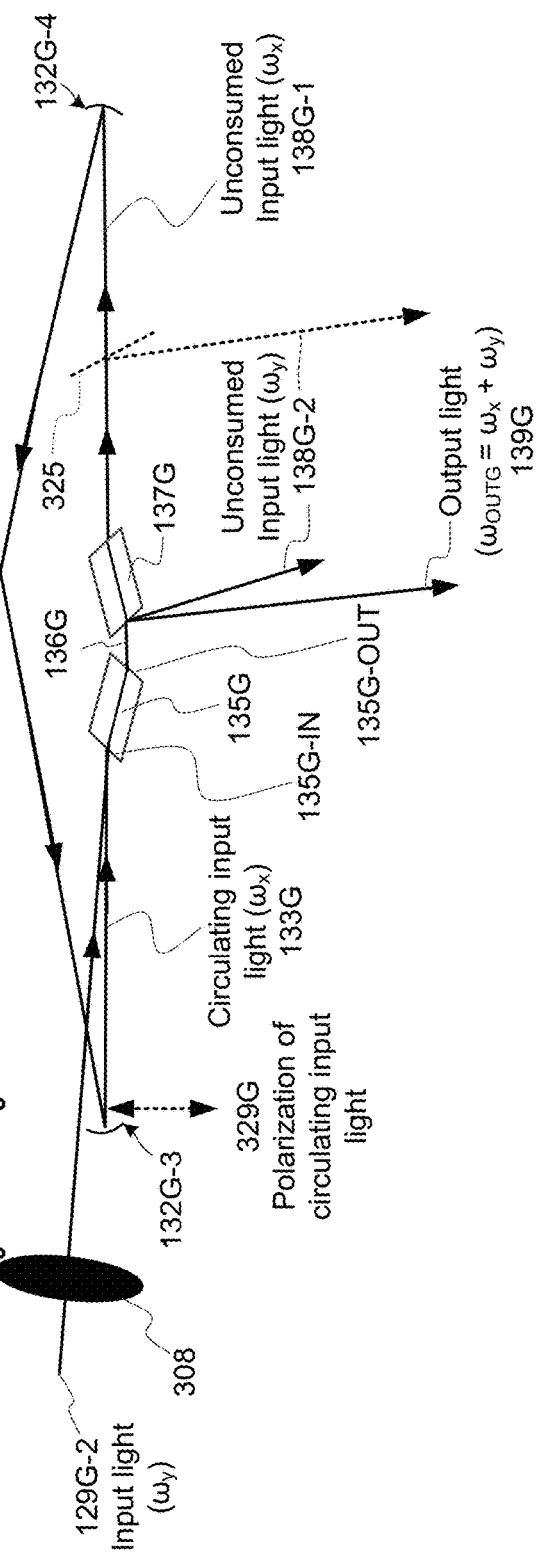
FIG. 6 is a simplified diagram showing an exemplary final frequency doubling stage utilized in the laser assemblies of the third, fourth and fifth specific embodiments according to an exemplary embodiment of the present invention.

FIG. 6 is a simplified diagram showing an exemplary final frequency summing stage 130G utilized in the 152 nm laser assembly of FIG. 5A, in the 152 nm laser assembly of FIG. 5B and in the 177 nm laser assembly of FIG. 5C according to exemplary embodiments of the present invention. Input light 129G (with frequency $\omega_x$, for example $\omega_x=2\omega_1+\omega_2$ when stage 130G is used in the 152 nm laser 100D of FIG. 5A, $\omega_x=2\omega_1$ when stage 130G is used in the 152 nm laser 100E of FIG. 5B, or $\omega_x=2\omega_2$ when stage 130G is used in the 177 nm laser 100F of FIG. 5C) enters a bow-tie ring cavity comprising input coupler 132G-1, flat mirror 132G-2, curved mirrors 132G-3, 132G-4 and a nonlinear crystal 135G (including an input surface 135G-IN and an output surface 135G-OUT) through input coupler 132G-1 and is recirculated to enhance the power. Input light (second intermediate light beam) 129G-2 with frequency $\omega_y$ (e.g., $\omega_y=4\omega_1$ when stage 130G is used in the 152 nm laser 100D of FIG. 5A, or $\omega_y=4\omega_1+\omega_2$ when stage 130G is used in the 152 nm laser 100E of FIG. 5B, or $\omega_y=4\omega_1$ when stage 130G is used in the 177 nm laser 300 of FIG. 5C) enters the bow-tie ring cavity passing close to (but not necessarily through) mirror 132G-2 and passes through nonlinear crystal 135G. Exiting light 136G, which is output from nonlinear crystal 135G through output surface 135C-OUT, comprises unconsumed input light 138G-1 with frequency $\omega_x$, unconsumed input light 138G-2 with frequency $\omega_y$ and the generated laser output light 139G with an output frequency $\omega_{OUTG}$ that is equal to a sum of the frequencies $\omega_x$ and $\omega_y$ of intermediate (input) light beams 129G-1 and 129G-2 (i.e., frequency $\omega_{OUTG}$ can be either substantially equal to the seventh harmonic output light 139D and 139E of FIG. 5A or 5B, or the sixth harmonic output light 139F of FIG. 5C). The laser output light 139G is reflected from the input surface of beam splitter (BS) 137G and directed out of the cavity. Unconsumed input light 138G-1 with frequency $\omega_x$ passes through beam splitter 137G and optional beam splitter 325 (if present) and is reflected by mirrors 132G-4 and 132G-1 to enhance the intensity of circulated light 133G. Unconsumed input light 138G-2 of frequency $\omega_y$ exits the cavity after being reflected either from beam splitter 137G or from an optional (second) beam splitter 325. The polarization direction of the circulating input light 133G is illustrated by arrow 329G.

Frequency summing stage 130G may be modified using any of the features and alternatives described above with reference to frequency doubling stage 130C of FIG. 3. For example, stage 130G utilizes one or more lenses 131G to focus input light 129C-1 with frequency $\omega_x$ as described above, and also utilizes one or more lenses 308 to focus input light 129G-2 as it enters the cavity near mirror 132G-3, where both one or more lenses 131G and one or more lenses 308 are configured as described above with reference to lenses 131C (FIG. 3). Furthermore, beam splitter 137G may be configured as described above with reference to beam splitter 137C of FIG. 3. Note that when final frequency summing stage 130G is used in a pulsed laser, no cavity is needed, and input lights 129G-1 and 129G-2 may be made colinear (or nearly colinear such as within 5° of one another), directed to, and focused in or proximate to, nonlinear crystal 135G by any suitable combination of lenses and/or mirrors.

FIG. 7 illustrates an exemplary nonlinear crystal 135G including four stacked SBO plates 135G-1 to 135G-4 configured to sum input light 133G of frequency $\omega_x$ and input light 129G-2 of frequency $\omega_y$. Although nonlinear crystal 135G is depicted as including four plates, the total number of plates may, for example, be as few as two or may be more than ten, and there may either an even number of plates (as depicted) or an odd number of SBO crystal plates. The thickness of each of the SBO plates 135G-1 to 135G-4 may be about ten microns to about two millimeters. Concretely, the SBO plate thickness $\Lambda$ is given by $\Lambda=mL_c$ where m=1, 3, 5, 7 . . . and quasi-phase-matching critical length $$L_c = \frac{\pi}{\Delta k}.$$

When the polarizations of input light 133G, input light 129G-2 and exiting light 136G are all substantially aligned parallel to the c-axes of the SBO crystal plates in order to take advantage of the largest non-linear coefficient ($d_{33}$) of SBO, the quasi-phase-matching critical length $L_c$ is about 0.30 μm when the final frequency summing stage 130G is utilized to generate the 152 nm laser output light 139D of FIG. 5A, about 0.34 μm when the final frequency summing stage 130G is utilized to generate the 152 nm laser output light 139E of FIG. 5B, and about 0.66 μm when the final frequency summing stage 130G is utilized to generate the 177 nm laser output light 139F of FIG. 5C. A reasonable m may be on the order of hundreds or thousands in order to achieve a convenient slab thickness for handling and processing. Other combinations of the polarization orientations of input light 129G-1, input light 129G-2 and output light 139G are possible and would have different phase-matching critical lengths. One skilled in the appropriate arts would understand how to calculate the phase-matching critical lengths from the refractive indices of SBO. The conversion efficiency of such polarization combinations would generally be lower than when all the polarizations are parallel to the c-axis owing to the other non-linear coefficients of SBO being smaller than $d_{33}$. However, such a configuration might be preferred for another reason, for example, simplifying combining or separating wavelengths based on their polarization.

Referring to FIG. 7, input light 133G with frequency $\omega_x$ and input light beam 129G-2 with frequency $\omega_y$ are incident on input surface 135G-IN of nonlinear crystal 135G, which in the depicted example is implemented using an exposed surface of SBO crystal plate 135G-4. The polarization direction of input light 133G (and input light 129G-2) is illustrated by arrow 329G. The angle β between the propagating directions of input light 133G and input light 129G-2 should be small, such as less than 5°, preferably about 2° or less. In a preferred embodiment, nonlinear crystal 135G is configured so that input surface 135G-IN and output surface 135G-OUT are oriented approximately at Brewster's angle θ relative to the input light 133G of frequency $\omega_x$ so as to minimize reflection losses without using an antireflection coating. Exiting light 136G comprises output light 139G of sum frequency $\omega_x+\omega_y$, unconsumed input light 138G-1 with frequency $\omega_x$, and unconsumed input light 138G-2 with frequency $\omega_y$.

In order to create a periodic structure for QPM, the two or more SBO plates 135G-1 to 135G-4 are placed with one rotated relative to the other such that their corresponding c crystal axes are inverted with respect to each other as shown in the two insets of FIG. 7. The surface normal N of the SBO plate of thickness $\Lambda$ and the propagation direction of light 133G inside the SBO plate are shown in the two insets. This physical arrangement of the crystal plates allows for QPM. In a preferred embodiment, the thickness of each plate is substantially equal to $\Lambda=mL_c$ where m=1, 3, 5, 7 . . . as explained above. In the context of QPM, substantially equal means equal to within about 20% or within about 10% of the quasi-phase-matching critical length $L_c$. In one embodiment, a large SBO plate is polished to the desired thickness, then divided into individual smaller pieces that are assembled in the correct orientations relative to one another to form nonlinear crystal 135G.

In a preferred embodiment, the crystal axes of SBO crystal plates 135G-1 to 135G-4 are oriented such that input light 133G and input light 129G-2 passing through the SBO plates propagate substantially perpendicular to the c-axis with a polarization direction (electric field direction) of light 133G and 129G-2 substantially parallel to the c-axis to take advantage of $d_{33}$ being the largest non-linear optical coefficient of SBO and hence maximize conversion efficiency. For example, as depicted in FIG. 7, the crystal axes of SBO plate 132G-4 may be oriented such that light 133G and light 129G-2 propagate substantially parallel to the a-axis of the SBO crystal. Alternatively, the crystal axes may be oriented such that light 133G and light 129G-2 propagate parallel to the b-axis, or at some angle within an a-b plane of the crystal. If the input surface of SBO plate 132G-4 is oriented at Brewster's angle $\theta$ with respect to the direction of polarization 329G of the input light 133G/129G-2, then the direction of propagation of the light within plate 132G-4 will be approximately 29.5±1° relative to surface normal N. Note that input light 133C and 129G-2 are incident on the input surface 135G-IN at an angle of a few degrees relative to one another as explained above, hence they propagate almost parallel to one another inside SBO plates 132G-1 to 132G-4 and can regarded as propagating in substantially one direction.

The above-described figures are not meant to represent the actual physical layout of the components. The above-described figures show the main optical modules involved in the process, but do not show every optical element. One skilled in the appropriate arts would understand how to build the 177 nm, 152 nm and 133 nm lasers from the above-described figures and their associated descriptions. It is to be understood that more or fewer optical components may be used to direct the light where needed. Lenses and/or curved mirrors may be used to focus the beam waist to foci of substantially circular or elliptical cross sections inside or proximate to the non-linear crystals where appropriate. Prisms, beam-splitters, gratings or diffractive optical elements may be used to steer or separate the different wavelengths at the outputs of each frequency conversion stage when needed. Prisms, coated mirrors, or other elements may be used to combine the different wavelengths at the inputs to the frequency conversion stages as appropriate. Beam splitters or coated mirrors may be used as appropriate to divide one wavelength into two beams. Filters may be used to block or separate undesired wavelengths at the output of any stage. Waveplates may be used to rotate the polarization as needed. Other optical elements may be used as appropriate. One skilled in the appropriate arts would understand the various tradeoffs and alternatives that are possible in the implementation of the 177 nm, 152 nm and 133 nm lasers.

In the various alternative embodiments described above, the first fundamental laser may be configured to generate first fundamental light at first fundamental frequency $\omega_1$ having a corresponding wavelength equal to one of approximately 1070 nm, approximately 1064 nm, approximately 1053 nm, approximately 1047 nm, and approximately 1030 nm. If used, the second fundamental laser may be configured to generate second fundamental light at second fundamental frequency $\omega_2$ having a corresponding wavelength equal to one of approximately 1070 nm, approximately 1064 nm, approximately 1053 nm, approximately 1047 nm, and approximately 1030 nm. The various harmonic frequencies mentioned herein are based on corresponding multiples of the fundamental frequencies. The exact wavelength of light generated by a given fundamental laser depends on many factors including the exact composition of the lasing medium, the operating temperature of the lasing medium, and the design of the optical cavity. Two lasers using the same laser line of a given lasing medium may operate at wavelengths that differ by a few tenths of 1 nm or a few nm due to the aforementioned and other factors. One skilled in the appropriate arts would understand how to choose the appropriate first and second fundamental wavelengths in order to generate the desired output wavelength from any one or two fundamental wavelengths.

Although the present invention is described herein using various fundamental wavelengths that facilitate generating laser output light at desired wavelengths of approximately 177 nm, approximately 152 nm or approximately 133 nm, other wavelengths within a few nanometers of these desired wavelengths can be generated using different fundamental wavelengths. Unless otherwise specified in the appended claims, such lasers and systems utilizing such lasers are considered within the scope of this invention.

Compared to pulsed lasers, a CW light source has a constant power level, which avoids the peak power damage issues and also allows for images or data to be acquired continuously. Also, the bandwidth of the generated CW light is several orders of magnitude narrower than typical mode-locked lasers, so the design of the corresponding illumination or detection optical system can be much less complex with better performance and lower system cost. However, some inspection and metrology applications can tolerate the higher bandwidth and peak power levels of a pulsed laser. A pulsed laser is simpler than a CW laser as resonant cavities are not needed for the frequency conversion stages. Hence both CW and pulsed lasers are within the scope of the invention disclosed herein and may be used as appropriate.

Lasers with a wavelength in the sub-200 nm are not commercially available at sufficient power level or are very unreliable. In particular, there is no prior art for generating light of hundreds of mW of power or greater in the wavelength range between approximately 125 nm and 183 nm. The embodiments of the present invention generate short wavelength down to approximately 133 nm, therefore provide better sensitivity for detecting small particles and defects than longer wavelengths. Another aspect of the invention is a wafer, reticle or photomask inspection or metrology system that incorporates at least one of the inventive 177 nm, 152 nm and 133 nm lasers described above. Aspects of such systems are illustrated in FIGS. 8, 9 and 10.

Figure 8:
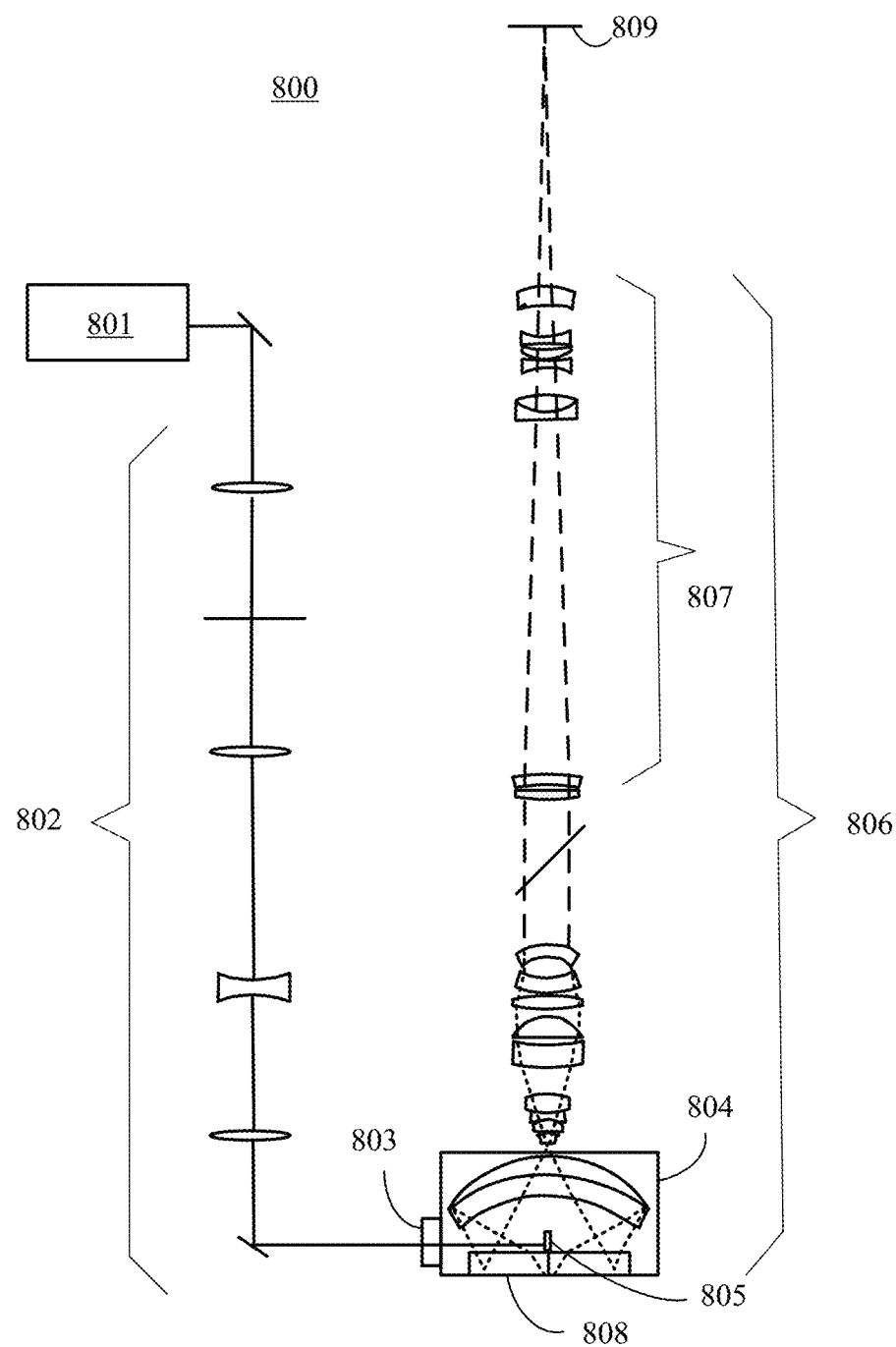
FIG. 8 is a simplified diagram showing an exemplary inspection system with dark-field and bright field inspection modes that utilizes one of the laser assemblies described herein in accordance with another specific embodiment of the present invention.

This laser may be used in an inspection system with dark-field and bright-field inspection modes as shown in FIG. 8. This figure and the system are explained in U.S. Pat. No. 7,817,260 to Chuang et al., which is incorporated by reference as if fully set forth herein. FIG. 8 illustrates a catadioptric imaging system 800 incorporating normal incidence laser illumination. The illumination block of system 800 includes a laser 801, adaptation optics 802 to control the illumination beam size and profile on the surface being inspected, an aperture and window 803 in a mechanical housing 804, and a prism 805 to redirect the laser along the optical axis at normal incidence to the surface of a sample 808. Prism 805 also directs the specular reflection from surface features of sample 808 and reflections from the optical surfaces of an objective 806 along the optical path to an image plane 809. Lenses for objective 806 can be provided in the general form of a catadioptric objective, a focusing lens group, and a zooming tube lens section 807. In a preferred embodiment, laser 801 can be implemented by the one of above-described lasers.

Figure 9A:
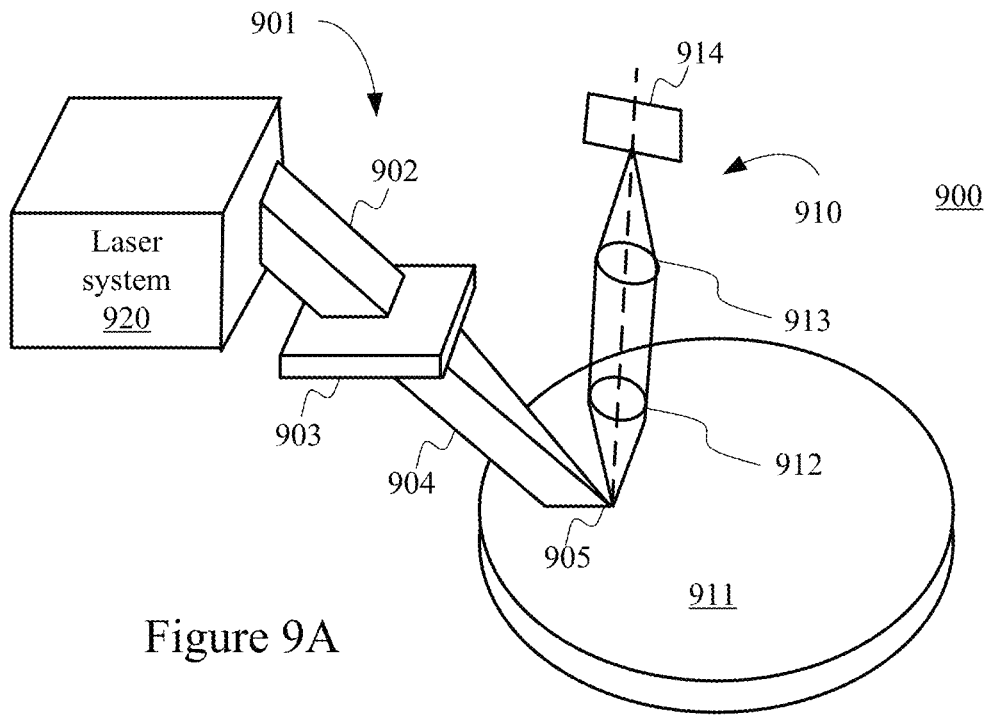
FIGS. 9A and 9B illustrates dark-field inspection systems that respectively utilize one of the laser assemblies described herein in accordance with another specific embodiment of the present invention.
Figure 9B:
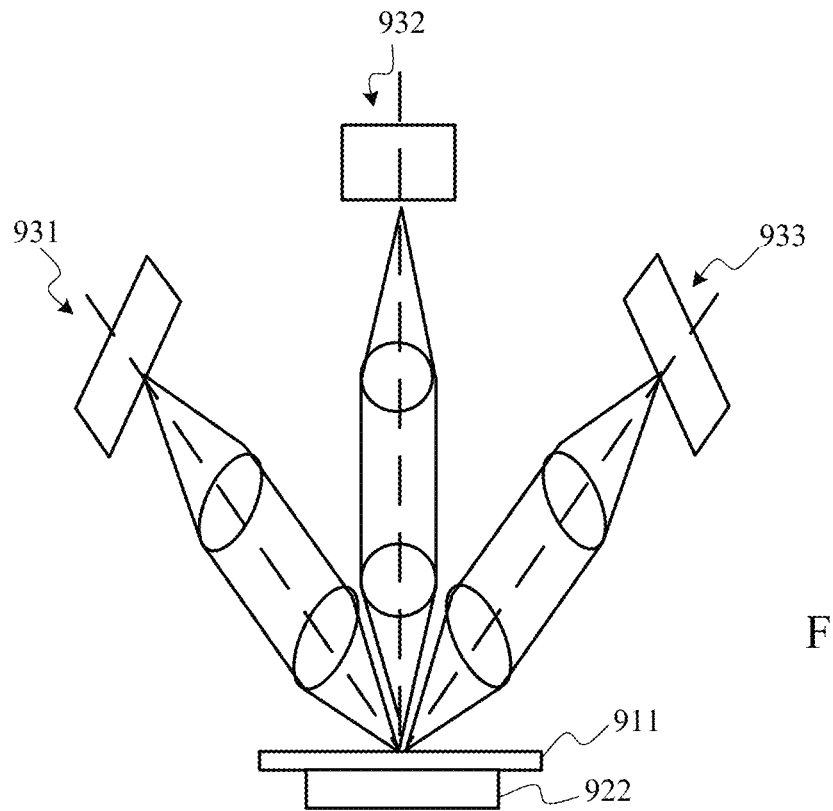

This laser may be used in a dark-field inspection system with oblique line illumination as shown in FIGS. 9A and 9B. This inspection system may have 2 or 3 different collection systems including off axis and near normal collection as shown. This dark field inspection system may also include normal incidence line illumination (not shown). More details including an explanation of the system shown in FIGS. 9A and 9B can be found in U.S. Pat. No. 7,525,649 to Leong et al., which is incorporated by reference as if fully set forth herein.

FIG. 9A illustrates a surface inspection apparatus 900 that includes illumination system 901 and collection system 910 for inspecting areas of surface 911. As shown in FIG. 9A, a laser system 920 directs a light beam 902 through beam shaping optics 903. In a preferred embodiment, the laser system 920 includes at least one of the above-described lasers. First beam shaping optics 903 can be configured to receive a beam from the laser system, which is focused onto surface 911.

Beam shaping optics 903 is oriented so that its principal plane is substantially parallel to a sample surface 911 and, as a result, illumination line 905 is formed on surface 911 in the focal plane of beam shaping optics 903. In addition, light beam 902 and focused beam 904 are directed at a non-orthogonal angle of incidence to surface 911. In particular, light beam 902 and focused beam 904 may be directed at an angle between about 1° and about 85° from a normal direction to surface 911. In this manner, illumination line 905 is substantially in the plane of incidence of focused beam 904.

Collection system 910 includes lens 912 for collecting light scattered from illumination line 905 and lens 913 for focusing the light coming out of lens 912 onto a device, such as charge coupled device (CCD) 914, comprising an array of light sensitive detectors. In one embodiment, CCD 914 may include a linear array of detectors. In such cases, the linear array of detectors within CCD 914 can be oriented parallel to illumination line 905. In another embodiment, CCD 914 may include a two-dimensional array of detectors, arranged as a rectangular array with its long axis parallel to illumination line 905. For example, CCD 914 may comprise a rectangular array of approximately 1000 to 8000 detectors by approximately 50 to 250 detectors. In one embodiment, multiple collection systems can be included, wherein each of the collection systems includes similar components, but differ in orientation.

For example, FIG. 9B illustrates an exemplary array of collection systems 931, 932, and 933 for a surface inspection apparatus (wherein its illumination system, e.g., similar to that of illumination system 901, is not shown for simplicity). First optics in collection system 931 collect light scattered in a first direction from the surface of sample 911. Second optics in collection system 932 collect light scattered in a second direction from the surface of sample 911. Third optics in collection system 933 collect light scattered in a third direction from the surface of sample 911. Note that the first, second, and third paths are at different angles of reflection to said surface of sample 911. A platform 912 supporting sample 911 can be used to cause relative motion between the optics and sample 911 so that the whole surface of sample 911 can be scanned.

Figure 10:
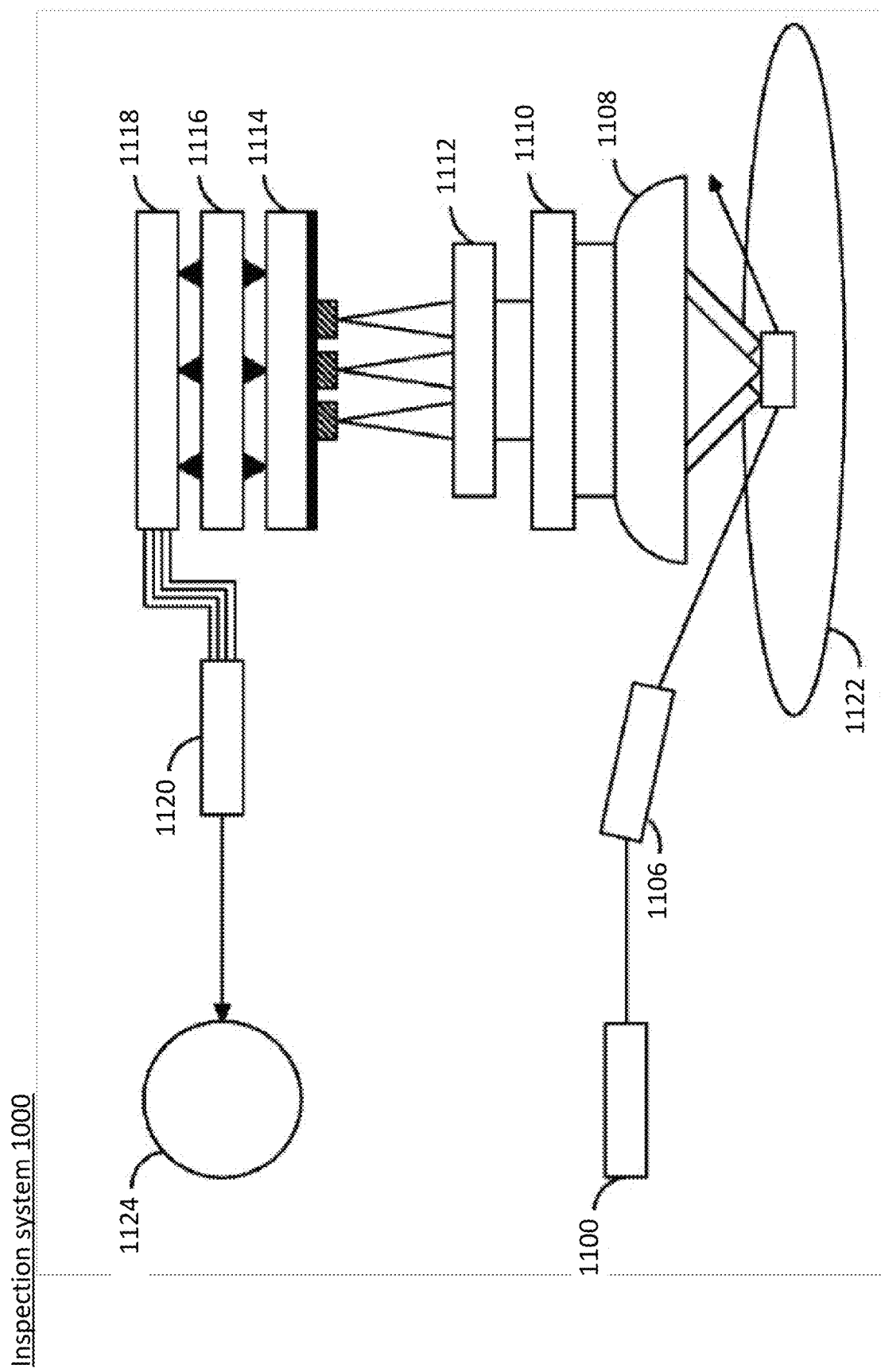
FIG. 10 illustrates an alternative dark-field inspection system configured for inspecting unpatterned wafers using one of the laser assemblies described herein in accordance with another specific embodiment of the present invention.

This laser may also be used in inspection systems for un-patterned wafers such as inspection system 1000 shown in FIG. 10. Such an inspection system may incorporate oblique and/or normal incidence illumination and a large collection solid angle for the scattered light as shown in these figures. Illumination source 1100 incorporates at least one of the lasers described herein that generates VUV light to illuminate wafer 1122 at a desirable angle to ensure that reflected light is not collected by a system of imaging collection optics 1108. Optics 1106 may be configured to generate the desired illumination pattern. Scattered light from the wafer 1122 may be collected by a system of imaging collection optics 1108 configured to direct the light into an afocal lens system 1110. In one embodiment collection lens mask system 1112 may divide the light into a plurality of channels for delivery to a TDI sensor 1118. One embodiment may include an intensifier 1114 and/or a sensor relay 1116. TDI sensor 1118 and/or intensifier 1114 may be configured to transmit signals to image processing computer 1120, which may be configured to generate a wafer image and/or a list of defects or particles on the surface of wafer 1122. Additional explanation of the elements of FIG. 10 can be found in U.S. Pat. No. 9,891,177B2 to Vazhaeparambil et al. Further details on unpatterned wafer inspection systems can be found in U.S. Pat. Nos. 6,201,601 and 6,271,916. All of these patents are incorporated by reference as if fully set forth herein.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A laser assembly for generating a laser output light beam having an output frequency with a corresponding wavelength in the range of approximately 125 nm to approximately 183 nm, said laser assembly comprising:
   one or more fundamental lasers respectively configured to generate a fundamental light beam having a corresponding fundamental frequency;
   a plurality of intermediate frequency conversion stages collectively configured to generate one or more intermediate light beams using said one or more fundamental light beams, each of said one or more intermediate light beams having an associated intermediate frequency;

a final frequency conversion stage configured to pass said one or more intermediate light beams through a nonlinear crystal, wherein said nonlinear crystal includes a plurality of Strontium tetraborate $SrB_4O_7$ (SBO) crystal plates disposed in a stacked configuration such that each said SBO crystal plate forms an interface surface with at least one adjacent said crystal plate, and wherein said plurality of SBO crystal plates are cooperatively configured to form a periodic structure that achieves quasi-phase-matching (QPM) of said one or more intermediate light beams such that light exiting the nonlinear crystal includes said laser output light beam having said output frequency.

2. The laser assembly of claim 1, wherein said plurality of SBO crystal plates are configured such that a first crystal axis of said each SBO crystal plate is inverted with respect to a second crystal axis of said adjacent SBO crystal plate.

3. The laser assembly of claim 1, wherein the final frequency conversion stage is configured such that said one or more intermediate light beams propagate through said plurality of SBO crystal plates in a direction parallel to one of (i) the a-axes and (ii) the b-axes of said first and second crystal axes.

4. The laser assembly according to claim 1, wherein the final frequency conversion stage further comprises:

a plurality of mirrors that are configured to receive and circulate said one or more intermediate light beams such that a beam waist of said one or more intermediate light beams occurs at said nonlinear crystal; and a beam splitter disposed to receive said light exiting said nonlinear crystal and configured such that said beam splitter reflects a first portion of said exiting light to form said laser output light beam, and such that a second portion of said exiting light passes through the beam splitter and is circulated by said plurality of mirrors.

5. The laser assembly of claim 1, wherein said beam splitter comprises one of an SBO crystal, SBO glass or a $CaF_2$ crystal.

6. The laser assembly of claim 1, wherein said one or more fundamental lasers are configured to generate a fundamental light having a fundamental frequency with a corresponding fundamental wavelength between 1 μm and 1.1 μm, wherein said plurality of intermediate frequency conversion stages comprises:

a first frequency doubling stage coupled to receive said fundamental light, and configured to generate a second harmonic light having a second harmonic frequency equal to twice the fundamental frequency;

a second frequency doubling stage coupled to receive said second harmonic light from the first frequency doubling stage, and configured to generate said intermediate light beam as fourth harmonic light having a fourth harmonic frequency equal to four times the fundamental frequency, and wherein the final frequency conversion stage is configured to frequency-double the fourth harmonic light such that the output frequency of the laser output light is equal to eight times the fundamental frequency.

7. The laser assembly of claim 6, wherein said final frequency conversion stage further comprises a beam splitter positioned to receive light exiting the nonlinear crystal and configured such that a reflected portion of said exiting light that is reflected from a surface of said beam splitter comprises said eighth harmonic frequency forming said laser output light beam, and such that a non-reflected portion of said exiting light that passes through said beam splitter comprises an unconsumed portion of said fourth harmonic frequency.

8. The laser assembly of claim 6, wherein said plurality of SBO crystal plates are configured such that a first crystal axis of a first said SBO crystal plate is inverted with respect to a second crystal axis of an adjacent second said SBO crystal plate, wherein the crystal axes of the first and second SBO crystal plates are oriented such that the crystal c-axes of both the first and second SBO crystal plates are substantially parallel to a polarization direction of the fourth harmonic light passing through the first and second SBO crystal plates, wherein said output frequency is substantially equal to 133 nm, and wherein at least one of said first and second SBO crystal plates has a thickness such that a spacing between poles of said periodic structure is substantially equal to an odd multiple of a critical length of 0.13 μm to enable quasi phase matching of the fourth harmonic frequency and the eighth harmonic frequency.

9. The laser assembly of claim 1, wherein said one or more fundamental lasers comprise:

a first fundamental laser configured to generate first fundamental light having a first fundamental frequency with a corresponding fundamental wavelength between 1 μm and 1.1 μm; and a second fundamental laser configured to generate second fundamental light having a second fundamental frequency with a corresponding fundamental wavelength between 1 μm and 1.1 μm, wherein said plurality of intermediate frequency conversion stages comprises:

a frequency doubling stage coupled to receive said first fundamental light, and configured to generate a second harmonic light having a second harmonic frequency equal to twice the first fundamental frequency;

a frequency summing stage coupled to receive said second harmonic light from the frequency doubling stage and the second fundamental light, and configured to generate said intermediate light beam as third harmonic light having a third harmonic frequency substantially equal to three times the first fundamental frequency, and wherein the final frequency conversion stage is configured to frequency-double the third harmonic light such that the output frequency of the laser output light is substantially equal to six times the first fundamental frequency.

10. The laser assembly of claim 9, wherein said final frequency conversion stage further comprises a beam splitter positioned to receive light exiting the nonlinear crystal and configured such that a reflected portion of said exiting light that is reflected from a surface of said beam splitter comprises said sixth harmonic frequency forming said laser output light beam, and such that a non-reflected portion of said exiting light that passes through said beam splitter comprises an unconsumed portion of said third harmonic frequency.

11. The laser assembly of claim 9, wherein said plurality of SBO crystal plates are configured such that a first crystal axis of a first said SBO crystal plate is inverted with respect to a second crystal axis of an adjacent second said SBO crystal plate, wherein the crystal axes of the first and second SBO crystal plates are oriented such that the crystal c-axes of both the first and second SBO crystal plates are substantially parallel to a polarization direction of the third harmonic light passing through the first and second SBO crystal plates, wherein said output frequency is substantially equal to 177 nm, and wherein at least one of said first and second SBO crystal plates has a thickness such that a spacing between poles of said periodic structure is substantially equal to an odd multiple of a critical length of 0.60 μm to enable quasi phase matching of the third harmonic frequency and the sixth harmonic frequency.

12. The laser assembly of claim 1,
wherein said one or more fundamental lasers comprises:
a first fundamental laser configured to generate first fundamental light having a first fundamental frequency with a corresponding fundamental wavelength between 1 μm and 1.1 μm; and
a second fundamental laser configured to generate second fundamental light having a second fundamental frequency with a corresponding fundamental wavelength between 1 μm and 1.1 μm,
wherein said plurality of intermediate frequency conversion stages comprises:
a first frequency doubling stage coupled to receive said first fundamental light, and configured to generate a second harmonic light having a second harmonic frequency equal to twice the first fundamental frequency;
a frequency summing stage coupled to receive a first portion of said second harmonic light from the first frequency doubling stage and the second fundamental light, and configured to generate a first said intermediate light beam as third harmonic light having a third harmonic frequency substantially equal to three times the first fundamental frequency; and
a second frequency doubling stage coupled to receive a second portion of said second harmonic light from the first frequency doubling stage, and configured to generate a second said intermediate light beam as fourth harmonic light having a fourth harmonic frequency equal to four times the first fundamental frequency, and
wherein the final frequency conversion stage is configured to sum the third harmonic light received from the frequency summing stage and the fourth harmonic light received from the second frequency doubling stage such that the output frequency of the laser output light is substantially equal to seven times the first fundamental frequency.

13. The laser assembly of claim 12, wherein said final frequency conversion stage further comprises a beam splitter positioned to receive light exiting the nonlinear crystal and configured such that a reflected portion of said exiting light that is reflected from a surface of said beam splitter comprises said seventh harmonic frequency forming said laser output light beam, and such that a non-reflected portion of said exiting light that passes through said beam splitter comprises an unconsumed portion of said third harmonic frequency.

14. The laser assembly of claim 12,
wherein said plurality of SBO crystal plates are configured such that a first crystal axis of a first said SBO crystal plate is inverted with respect to a second crystal axis of an adjacent second said SBO crystal plate, wherein the first and second SBO crystal plates are oriented such that the crystal c-axes of both the first and second crystal axes and substantially parallel to a polarization direction of the third and fourth harmonic light passing through the first and second SBO crystal plates, wherein said output frequency is substantially equal to 152 nm, and wherein at least one of said first and second SBO crystal plates has a thickness such that a spacing between poles of said periodic structure is substantially equal to an odd multiple of a critical length of 0.30 μm to enable quasi phase matching of the third harmonic frequency, the fourth harmonic frequency and the seventh harmonic frequency.

15. The laser assembly of claim 1,
wherein said one or more fundamental lasers comprises:
a first fundamental laser configured to generate first fundamental light having a first fundamental frequency with a corresponding fundamental wavelength between 1 μm and 1.1 μm; and
a second fundamental laser configured to generate second fundamental light having a second fundamental frequency with a corresponding fundamental wavelength between 1 μm and 1.1 μm,
wherein said plurality of intermediate frequency conversion stages comprises:
a first frequency doubling stage coupled to receive said first fundamental light, and configured to generate a second harmonic light having a second harmonic frequency equal to twice the first fundamental frequency;
a second frequency doubling stage coupled to receive a first portion of said second harmonic light from the first frequency doubling stage, and configured to generate a fourth harmonic light having a fourth harmonic frequency equal to four times the first fundamental frequency;
a frequency summing stage coupled to receive said fourth harmonic light from the second frequency doubling stage and the second fundamental light, and configured to generate a fifth harmonic light having a fifth harmonic frequency substantially equal to five times the first fundamental frequency, and
wherein the final frequency conversion stage is configured to sum said fifth harmonic light with a second portion of said second harmonic light from the first frequency doubling stage such that the output frequency of the laser output light is substantially a seventh harmonic frequency of the first fundamental frequency.

16. The laser assembly of claim 15, wherein said final frequency conversion stage further comprises a beam splitter positioned to receive light exiting the nonlinear crystal and configured such that a reflected portion of said exiting light that is reflected from a surface of said beam splitter comprises said seventh harmonic frequency forming said laser output light beam, and such that a non-reflected portion of said exiting light that passes through said beam splitter comprises an unconsumed portion of said second harmonic frequency.

17. The laser assembly of claim 15,
wherein said plurality of SBO crystal plates are configured such that a first crystal axis of a first said SBO crystal plate is inverted with respect to a second crystal axis of an adjacent second said SBO crystal plate,
wherein the crystal axes of the first and second SBO crystal plates are oriented such that the crystal c-axes of both the first and second SBO crystal plates are substantially parallel to a polarization direction of the third and fourth harmonic light passing through the first and second SBO crystal plates, and wherein at least one of said first and second SBO crystal plates has a thickness such that a spacing between poles of said periodic structure is substantially equal to an odd multiple of a critical length of 0.34 μm to enable quasi phase matching of the second harmonic frequency, the fifth harmonic frequency and the seventh harmonic frequency.

18. The laser assembly of claim 1, wherein said one or more fundamental lasers comprises:
a first fundamental laser configured to generate first fundamental light having a first fundamental frequency with a corresponding fundamental wavelength between 1 μm and 1.1 μm; and
a second fundamental laser configured to generate second fundamental light having a second fundamental frequency with a corresponding fundamental wavelength between 1 μm and 1.1 μm, wherein said plurality of intermediate frequency conversion stages comprises:
a first frequency doubling stage coupled to receive said second fundamental light, and configured to generate a first said intermediate light beam having a second harmonic frequency equal to twice the second fundamental frequency;
a second frequency doubling stage coupled to receive said first fundamental light, and configured to generate second harmonic light having a second harmonic frequency equal to twice the first fundamental frequency; and
a third frequency doubling stage coupled to receive said second harmonic light from the second frequency doubling stage, and configured to generate a second said intermediate light beam having a fourth harmonic frequency equal to four times the first fundamental frequency, and wherein the final frequency conversion stage is configured to sum said first intermediate light beam and said second intermediate light beam such that the output frequency of the laser output light has a sixth harmonic frequency that is substantially equal to six times the first fundamental frequency.

19. The laser assembly of claim 18, wherein said final frequency conversion stage further comprises a beam splitter positioned to receive light exiting the nonlinear crystal and configured such that a reflected portion of said exiting light that is reflected from a surface of said beam splitter comprises said sixth harmonic frequency forming said laser output light beam, and such that a non-reflected portion of said exiting light that passes through said beam splitter comprises an unconsumed portion of said second harmonic frequency.

20. The laser assembly of claim 18, wherein said plurality of SBO crystal plates are configured such that a first crystal axis of a first said SBO crystal plate is inverted with respect to a second crystal axis of an adjacent second said SBO crystal plate, wherein the crystal axes of the first and second SBO crystal plates are oriented such that the crystal c-axes of both the first and second SBO crystal plates are substantially parallel to a polarization direction of the second and fourth harmonic light passing through the first and second SBO crystal plates, and wherein at least one of said first and second SBO crystal plates has a thickness such that a spacing between poles of said periodic structure is substantially equal to an odd multiple of a critical length of 0.66 μm to enable quasi phase matching of the second harmonic frequency, the fourth harmonic frequency and the sixth harmonic frequency.

21. A method for generating a laser output light beam having an output frequency with a corresponding wavelength in the range of approximately 125 nm to approximately 183 nm, said method comprising:

generating one or more fundamental light beams such that each said fundamental light beam has a corresponding fundamental frequency with a corresponding fundamental wavelength between about 1 μm and 1.1 μm;
utilizing a plurality of intermediate frequency conversion stages collectively configured to generate one or more intermediate light beams using said one or more fundamental light beams, each of said one or more intermediate light beams having an associated intermediate frequency;
utilizing a final frequency conversion stage to pass said one or more intermediate light beams through a nonlinear crystal,
wherein said nonlinear crystal includes a plurality of Strontium tetraborate $SrB_4O_7$ (SBO) crystal plates disposed in a stacked configuration such that each said SBO crystal plate forms an interface surface with at least one adjacent said crystal plate, and
wherein said plurality of SBO crystal plates are cooperatively configured to form a periodic structure that achieves quasi-phase-matching (QPM) of said one or more intermediate light beams such that light exiting the nonlinear crystal includes said laser output light beam having said output frequency.

22. An inspection system configured to inspect a sample using a laser output light beam having an output frequency with a corresponding wavelength in the range of approximately 125 nm to approximately 183 nm, wherein said laser output light beam is generated by a laser assembly comprising:

one or more fundamental lasers respectively configured to generate a fundamental light beam having a corresponding fundamental frequency;
a plurality of intermediate frequency conversion stages collectively configured to generate one or more intermediate light beams using said one or more fundamental light beams, each of said one or more intermediate light beams having an associated intermediate frequency;
a final frequency conversion stage configured to pass said one or more intermediate light beams through a nonlinear crystal,
wherein said nonlinear crystal includes a plurality of Strontium tetraborate $SrB_4O_7$ (SBO) crystal plates disposed in a stacked configuration such that each said SBO crystal plate forms an interface surface with at least one adjacent said crystal plate, and
wherein said plurality of SBO crystal plates are cooperatively configured to form a periodic structure that achieves quasi-phase-matching (QPM) of said one or more intermediate light beams such that light exiting the nonlinear crystal includes said laser output light beam having said output frequency.

23. A nonlinear crystal configured to convert one or more input light frequencies into an output frequency with a corresponding wavelength in the range of approximately 125 nm to approximately 183 nm, wherein said nonlinear crystal comprises:
- a plurality of Strontium tetraborate $SrB_4O_7$ (SBO) crystal plates disposed in a stacked configuration such that each said SBO crystal plate forms an interface surface with at least one adjacent said crystal plate,
- wherein said plurality of SBO crystal plates are configured such that a first crystal axis of said each SBO crystal plate is inverted with respect to a second crystal axis of said at least one adjacent SBO crystal plate, and
- wherein the thickness of at least one of said plurality of SBO crystal plates produces a spacing between poles that is substantially equal to an odd multiple of a critical length to enable quasi phase matching of the one or more input light frequencies and the output frequency, whereby light exiting the nonlinear crystal includes said laser output light having said output frequency.

* * * * *